United States Patent
Barton et al.

(10) Patent No.: US 7,433,297 B2
(45) Date of Patent: Oct. 7, 2008

(54) WIRELESS INTERNET ACCESS SYSTEM AND METHOD

(75) Inventors: Melbourne Barton, Somerville, NJ (US); Joseph C. Liberti, Howell, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 446 days.

(21) Appl. No.: 10/930,320

(22) Filed: Dec. 27, 2004

(65) Prior Publication Data

US 2005/0100120 A1    May 12, 2005

Related U.S. Application Data

(62) Division of application No. 09/293,217, filed on Apr. 16, 1999, now Pat. No. 6,947,408.

(60) Provisional application No. 60/082,073, filed on Apr. 17, 1998.

(51) Int. Cl.
    *H04J 11/00* (2006.01)
(52) U.S. Cl. .................. 370/207; 375/147; 375/267; 375/340
(58) Field of Classification Search .......... 370/203, 370/206, 207, 208; 375/267, 261, 219, 146, 375/147, 340
    See application file for complete search history.

(56) References Cited

U.S. PATENT DOCUMENTS

| | | | |
|---|---|---|---|
| 4,581,735 A | 4/1986 | Flamm et al. | |
| 5,063,574 A | 11/1991 | Moose et al. | |
| 5,528,581 A | 6/1996 | De Bot | |
| 5,581,578 A * | 12/1996 | De Bot | 375/261 |
| 5,617,411 A | 4/1997 | Mueller et al. | |
| 6,061,327 A * | 5/2000 | Demoulin et al. | 370/208 |
| 6,144,711 A * | 11/2000 | Raleigh et al. | 375/347 |
| 6,853,629 B2 * | 2/2005 | Alamouti et al. | 370/330 |
| 7,133,471 B2 * | 11/2006 | Feher | 375/340 |
| 2003/0048834 A1 * | 3/2003 | Feher | 375/219 |
| 2004/0100897 A1 * | 5/2004 | Shattil | 370/206 |
| 2005/0185699 A1 * | 8/2005 | Feher | 375/146 |

OTHER PUBLICATIONS

Leonard J. Cimini, Jr, et al, "OFDM with Diversity and Coding for High-Bit-Rate Mobile Data Applications", International Workshop on Mobile Multimedia Communications, 1997, pp. 247-254.

\* cited by examiner

*Primary Examiner*—Hassan Kizou
*Assistant Examiner*—Jeffrey M Rutkowski
(74) *Attorney, Agent, or Firm*—Philip J. Feig

(57) ABSTRACT

A wireless Internet access system and method supports the transmission and reception of multiple types of traffic between mobile subscriber units and existing networks. A frame structure is used that can support the transmission of multiple types of traffic and adapt to changes in the traffic types needed and the amount of data for a particular traffic type. In addition, data transmission is performed using orthogonal frequency division multiplexing and differential phase shift keying to avoid intersymbol interference. Receiving units in the mobile subscriber units and existing networks include antenna arrays to provide a multipath transmission.

2 Claims, 9 Drawing Sheets

US 7,433,297 B2

WIRELESS INTERNET ACCESS SYSTEM AND METHOD

CROSS-REFERENCE TO RELATED APPLICATIONS

This application is a divisional application of application Ser. No. 09/293,217 filed Apr. 16, 1999 now U.S. Pat. No. 6,947,408. The present application also claims the benefit of U.S. Provisional Application No. 60/082,073, filed Apr. 17, 1998, the contents of which are incorporated herein by reference.

BACKGROUND OF THE INVENTION

1. Field of the Invention

The present invention relates generally to methods and systems for wireless Internet access, and more particularly, to a wireless Internet access system (WIAS) capable of supporting multiple types of traffic.

2. Description of the Related Art

A number of wireless data systems have been deployed. In the early 1990's, the IEEE 802.11 standard established interoperability criteria and an interface for 1 and 2 Mbps wireless devices using Direct Sequence and Frequency Hopping Spread Spectrum for the 902-928 MHz and 2400-2483.5 MHz Industrial, Scientific, and Medical (ISM) bands. These systems were embodied in products, such as WaveLAN™ (originally developed by NCR and now by Lucent Technologies) and Proxim™. These IEEE 802.11 compliant systems are used for indoor LAN and outdoor point-to-point applications. Other systems, such as the Metricom Ricochet™ system supported data rates up to 28,800 bps for mobile, nomadic computing devices.

Around 1996, digital cellular and personal communications services (PCS) systems emerged. These systems could support data rates from 9.6 kbps (for IS-95 CDMA) to 32 kbps (for PACS). In 1997, the Unlicenced National Information Infrastructure (U-NII) band was created, which includes three 100 MHz segments in the 5 GHz band (5150-5250, 5250-5350, and 5725-5825 MHz), enabling higher data rates. At the same time, new systems, which included complex signal processing and multiple antennas, enabled higher data rates over complex multipath channels encountered in Wireless LAN applications. These systems included HIPERLAN™, developed by the European community, which supports data rates up to 24 Mbps. Another system, RadioLAN™, supports data rates up to 100 Mbps as a wireless Ethernet replacement system.

The above and other prior art systems, however, cannot provide the mobility and broad area coverage of PCS type systems with the data rates formerly reserved for LAN and point-to-point applications. Therefore, it is desirable to have a method and system for wireless Internet access that overcome the above and other disadvantages of the prior art.

SUMMARY OF THE INVENTION

A system and method consistent with the present invention supports the transmission and reception of multiple types of traffic between mobile subscriber units and existing networks. A frame structure is used that can support the transmission of multiple types of traffic and adapt to changes in the traffic types and the amount of data for a particular traffic type. In addition, data transmission is performed using orthogonal frequency division multiplexing and differential phase shift keying to avoid inter-symbol interference. Receiving units in the mobile subscriber units and networks include antenna arrays that provide for multipath transmission.

A method consistent with the present invention for decoding symbols modulated onto a plurality of subcarriers, each symbol corresponding to one or more data bits where each combination of bits represents a unique phase, comprises the steps of receiving, at a plurality of antennas, a waveform formed from the superposition of a plurality of modulated subcarriers, each modulated subcarrier having a different frequency and formed by modulating one of a plurality of serial symbols onto a corresponding one of a plurality of subcarriers based on the difference in phase between each pair of adjacent symbols. The method further comprises the steps of extracting the response of each antenna to each of the individual subcarriers, forming a vector for each subcarrier having a plurality of elements equal to the number of antennas, each element of a vector of a particular subcarrier representing the extracted response of one of the plurality of antennas to the particular subcarrier, combining mathematically the vectors corresponding to each pair of adjacent subcarriers to calculate the phase difference between each pair of adjacent subcarriers, and determining the value of each symbol based on the phase differences resulting from the mathematical combination of each pair of adjacent vectors.

Both the foregoing general description and the following detailed description provide examples and explanations only. They do not restrict the claimed invention.

DESCRIPTION OF THE DRAWINGS

The accompanying drawings, which are incorporated in and constitute a part of this specification, illustrate embodiments consistent with the invention and, together with the description, explain the advantages and principles of the invention.

In the drawings.

DETAILED DESCRIPTION OF THE INVENTION

Figure 1:
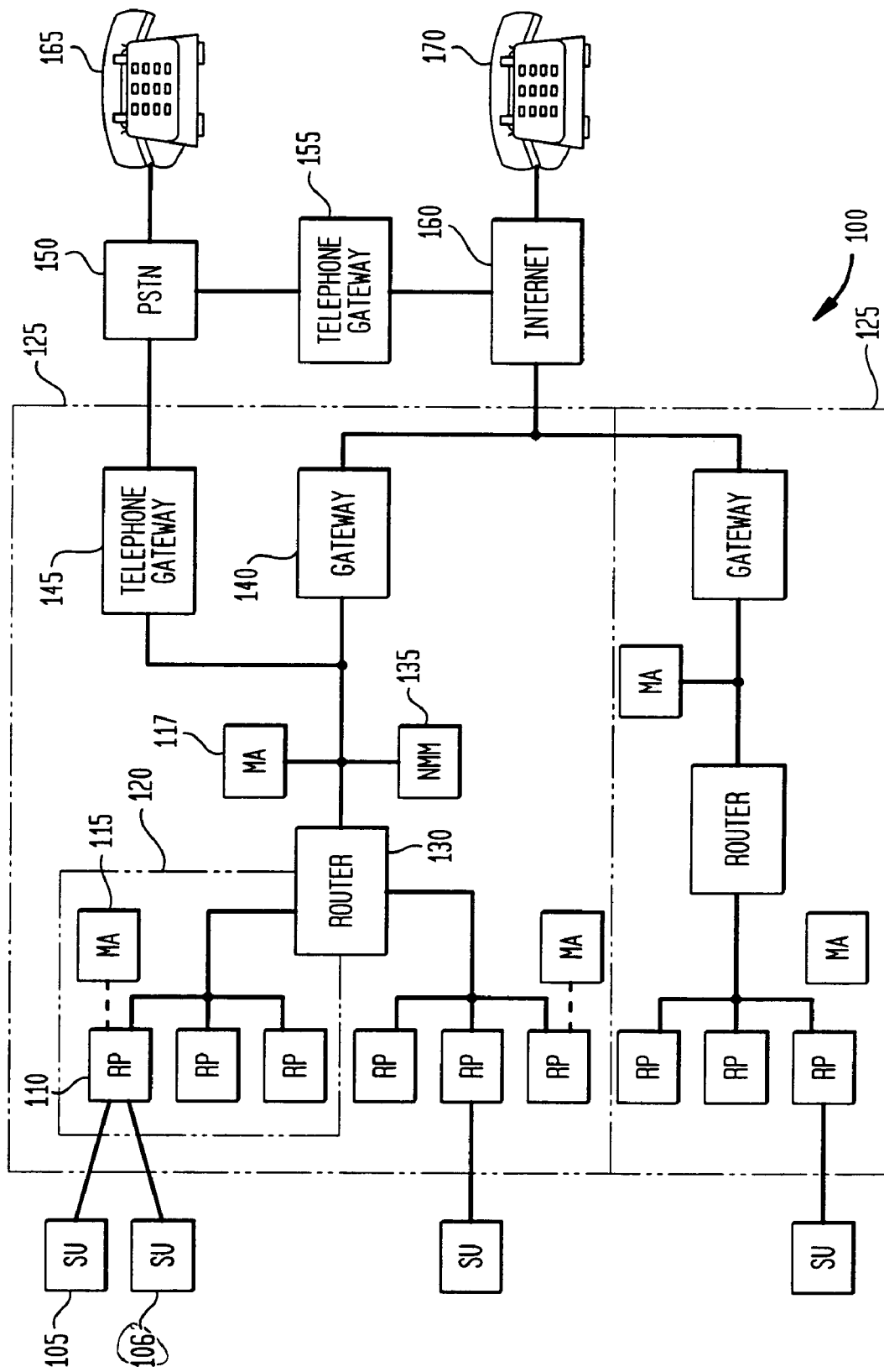
FIG. 1 is a block diagram of a wireless Internet access system (WIAS) consistent with the present invention.

Reference will now be made to preferred embodiments of this invention, examples of which are shown in the accompanying drawings and will be obvious from the description of the invention. In the drawings, the same reference numbers represent the same or similar elements in the different drawings whenever possible.

A WIAS system architecture consistent with the present invention includes major network functional elements, a radio interface, and important radio port and subscriber unit subsystems. The WIAS system provides an efficient means of supporting a wide variety of traffic types, ranging from broadband data pipes of up to 17.5 Mbps, to 32 kbps ADPCM voice. The WIAS system is designed with the flexibility to support both delay-tolerant and low-latency data, including voice and real-time multimedia. In addition, the WIAS system is resistant to multipath, and is tolerant of interference and spectrum reuse in unlicensed bands.

FIG. 1 is a block diagram of a wireless Internet access system (WIAS) 100 consistent with the present invention. WIAS 100 can be designed to use existing networks, such as a 100/10BaseT Ethernet network, an Asynchronous Transfer Mode (ATM) network, a Fiber Optics network, and a Token Ring network. Although WIAS 100 can be designed to use other networks as well, the following description will focus on the Ethernet implementation as a preferred implementation.

As shown in FIG. 1, WIAS 100 includes one or more islands 125, each island 125 including one or more subnets 120. Subnet 120 includes an existing network (not shown), such as the 100/10BaseT Ethernet LAN, and a plurality of radio ports (RP) 110 attached to the network. At least one of the RPs 110 in each subnet 120 includes mobility agent (MA) functionality, shown as MA 115 in FIG. 1.

More specifically, RPs 110 establish radio or wireless links with a plurality of subscriber units (SUs) 105, and also manage the termination and modification to the links. Each SU 105 can be homed to an existing subnet 120 by assigning it a permanent or home Internet Protocol (IP) address (HIP). Alternatively, a mobility agent can be independent of any other radio ports and exist as a virtual subnet, as shown by MA 117 in FIG. 1. In a virtual subnet, MA 117 acts as a home agent (HA) for SUs 105 not assigned to a real subnet, i.e., a subnet with multiple subscriber units in addition to a mobility agent. The functions and structures of SU 105, RP 110, and MAs 115 and 117 will be described in more detail below.

In addition to subnets 120, each island 125 includes elements for routing and processing information to and from subnets 120. These elements include a router 130, a network management and monitoring system (NMM) 135, a gateway 140, and a telephone gateway 145. Router 130 is a well known device for routing information to and from the network, and may be an existing part of the network. NMM 135 provides a single entity for operations, administration, and maintenance of WIAS 100. Gateway 140 represents an interface between the existing network and external communication systems and often includes firewall protection for the network. Telephone gateway 145 provides a mapping between mobile identification number (MIN) and Internet Protocol (EP) addresses for SUs 105 that are capable of supporting telephony functions. In addition, telephone gateway 145 can act as a voice EP modem for calls in progress.

Data from gateway 140 can be transmitted to an external communication system, such as the Internet 160, while data from telephone gateway 145 can be transmitted to a public switched telephone network (PSTN) 160. Data can also be transmitted between the Internet 160 and PSTN 150 via another telephone gateway 155. As shown in FIG. 1, a standard telephone 165 can be connected to PSTN 150, and an EP phone 170 can be connected to the Internet 160.

Mobility Functions of Subscriber Units

One of the functions of WIAS 100 is to support mobility for SUs 105. WIAS 100 supports two levels of mobility, allowing mobility within a subnet as well as roaming among foreign subnets that may be located in different islands. These levels of mobility are scaled so that a minimum amount of equipment is required to deliver the first level of intra-subnet mobility. As wider area mobility is required, additional functional units are added. Mobility functions include registration, location, and hand-off capabilities.

The first level of mobility involving mobility within subnet 120, or intra-subnet mobility, is entirely managed by RPs 110. An advantage to this approach is that small offices using LANs that comprise a single subnet 120 can use WIAS 100 by simply attaching RPs 110 to the existing 100/1OBaseT LAN. As WIAS 100 expands, additional mobility functions can be added to support inter-subnet roaming.

When an SU is activated, it scans all of the available channels in WIAS 100, searching for the RP having the strongest available signal. In some instances, particularly in the asynchronous unlicenced personal communication system (A-UPCS) 1910-1920 MHz band, multiple RPs may share a carrier, which is taken into account by a candidate carrier measurement algorithm within the SU.

The algorithm measures the received signal strength (RSS) from each RP. When the SU is not actively transmitting or receiving, the SU tunes to other frequency bands. If an RP is detected, SU stores in a table the RSS associated with the detected RP. Each table entry may be valid for a short period of time (e.g., 2 seconds). When the SU is initially activated or when the signal strength from a current RP drops below a threshold value, the SU tunes to the frequency of the RP with the highest RSS in the table and attempts to establish communication with that RP.

Specifically, when the strongest available RP signal is identified, the SU attempts to attach to that RP by transmitting a local registration message on a random access slot (RAS) channel, which is discussed in more detail herein. The registration message informs the RP that the SU is attaching to the network at that point. As a result of the registration, the RP provides its physical address in response to any address resolution protocol (ARP) requests for the SU's IP (SU.IP) address. Upon receiving the registration, the RP transmits a gratuitous ARP broadcast message throughout its subnet, allowing all other hosts on the subnet to update their ARP caches to reflect the current location of the SU.

Figure 2:
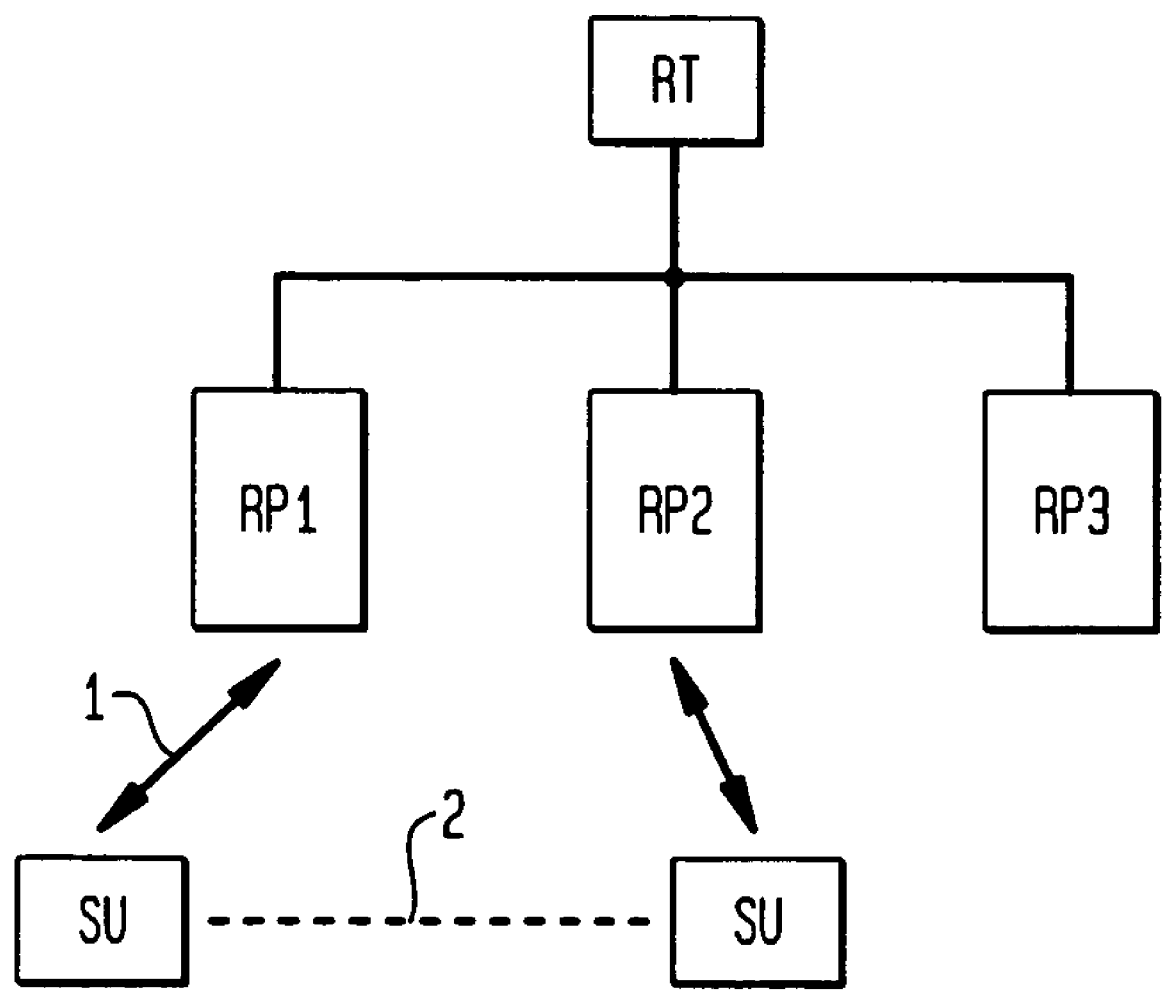
FIG. 2 is a block and flow diagram illustrating intra-subnet mobility of a subscriber unit in the WIAS system of FIG. 1.

As illustrated in FIG. 2, an SU registers with a radio port RP1 in step 1. If an SU loses contact with RP1 during transmission or reception of a packet, such as due to moving to a new location, or at periodic intervals when the SU is idle, the SU repeats the candidate carrier measurement procedure searching for better RP links. As shown in step 2, if the SU locates a new RP (RP2), it transmits a local registration message on the RAS. If RP2, already has an ARP entry cached which links the EP address of the registering SU (SU.IP) with the physical address of RP1 (RP1.PA), then RP2 transmits a gratuitous ARP to map the IP address of the SU with the physical address of RP2 for all other hosts on the subnet. When RP1 receives this ARP, it expires its previous registration and discontinues proxy ARP replies for the SU.

In the second level of mobility, an SU can roam seamlessly among subnets in an island, or even between different islands. To support this inter-subnet mobility, each subnet includes a mobility agent (MA). When an SU is homed to a real subnet, the MA attached to an RP acts as a home agent (HA) for that SU and acts as a foreign agent (FA) for all visiting SUs. When an SU is homed to a virtual subnet, the MA never acts as a foreign agent, but may act as a home agent for SUs that are homed to the virtual subnet.

Using SUs homed to real subnets is preferable when large subnets are used with extensive intra-subnet traffic. However, to reduce the complexity of the RPs used in the subnet, it may be preferable to use SUs homed to a virtual subnet. Using SUs homed to a virtual subnet is also preferable when many small subnets are present, when SUs spend a lot of time roaming from one subnet to the next, or when network traffic is not contained predominantly within a subnet.

An SU's home subnet is the subnet having a mask corresponding to the SU's permanent EP address (RIP). A foreign subnet is any other subnet where an SU might find itself. Either or both of the homing approaches can be used as appropriate. Either way, an SU that is roaming in a foreign subnet (which is always the case when a virtual subnet is used), is assigned a Care-of-Address (COA.IP) that is local to the foreign subnet. Whenever SU roams beyond its home subnet, the HA (the MA of the home subnet of the SU) traps any incoming packets destined for the SU. These incoming packets are then forwarded to the foreign subnet using the COA.IP, either with or without encapsulation.

With encapsulation, an entire EP packet, which may include the IP address of the sender and the recipient, is included as the payload of another IP packet with a new sender and recipient address. If a packet arrives at the "home" address of a mobile host when the mobile host is temporarily relocated to another EP subnet with a known forwarding address, the packet may be encapsulated with the temporary address of the mobile host in the new subnet as the "recipient" and the home address as the "sender." When the encapsulated packet arrives at the new subnet, the packet is routed to the mobile host, which strips off the encapsulation to recover the original message.

WIAS 100 supports full route optimization, assuming a suitable corresponding host (CH), i.e., the node sending packets to a roaming SU. Using route optimization, the first EP packet sent to a roaming SU from a CH is routed through the HA. If the CH supports route optimization, then subsequent packets are sent by the CH directly to the SU at its Care-of-Address, COA.IP. If the SU moves from one subnet to the next, then as the SU is registered in the new subnet, a new COA.IP address is obtained, and the bindings are updated with the SU's HA as well as any CHs capable of route optimization.

The registration procedure for intra-subnet roaming is modified slightly to accommodate inter-subnet roaming. Subscribers in foreign subnets always register using their H.IP address. When an RP receives a registration message from an SU that is not homed to that RP's subnet, the RP sends a mobility resolution request to the MA in its subnet. The MA sends a message to the SU's home agent requesting authentication for the SU and provides a Care-of-Address (COA.IP) that the HA can use for forwarding. The MA assigns the COA.IP address to the SU, which uses the COA.IP for the duration of its stay within the foreign subnet.

Another function provided by WIAS 100 is to support full seamless handoff for all types of traffic. Unlike PCS systems where a subscriber typically only has a single voice channel, links in WIAS 100 can comprise numerous connection-oriented traffic streams. The handoff process for WIAS 100 involves a negotiation of radio resources at the new radio port to ensure that low-latency channels are set up with priority and that error sensitive data is delivered in its entirety.

Figure 3:
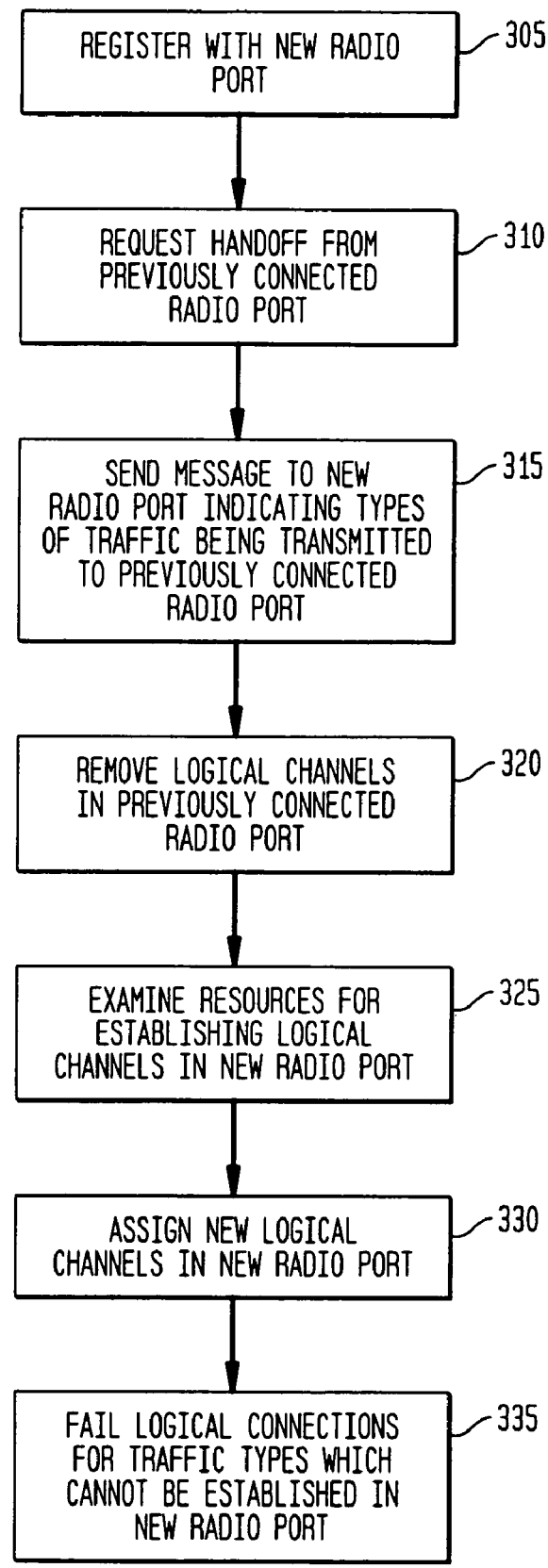
FIG. 3 is a flow diagram of a handoff process consistent with the present invention.

FIG. 3 shows a flow diagram of a handoff process consistent with the present invention. First, an SU successfully negotiates a registration with a new RP (step 305). The registration message includes the IP address of the RP to which the SU was previously linked (if any). With reference to FIG. 2, the new RP (RP2) sends a notification to the old RP (RP1) requesting a handoff over the 100/10BaseT network (step 310). RP1 responds with a message to RP2 containing the complete TCP/UDP (transmission control protocol/user datagram protocol) Port-to-logical channel mapping (TLM) information for the SU, along with the remainder of any partially delivered downlink data (step 315). RP1 tears down all logical channels associated with the SU (step 320), while RP2 examines its available radio resources and attempts to establish logical channels for each TCP port connection (step 325). Based on channel priority, such as constant bit rate (CBR) voice traffic first and delay tolerant packet data last, RP2 assigns new logical channels for each TCP port connection (step 330). If any logical channels cannot be assigned, some connections may fail based on TCP time-out settings (step 335). However, all successful logical channels will remain in place.

In order to minimize the number of dropped connections (TCP/UDP ports) during handoff, a system can be implemented so that every RP always supports particular types of upstream and downstream traffic. For example, each radio port could be implemented to always support some voice and packet data capabilities. By always supporting some voice capabilities, a radio port does not need to re-arrange its frame structure to support an arriving voice connection. Similarly, while the packet access mechanisms in WIAS 100 may be sub-optimal for dedicated data streams, they can temporarily support any TCP/IP data connection at a reduced quality of service (QoS) until a suitable logical channel can be established. Although these implementations for the radio ports are preferable, other frame structures may be more appropriate depending on the type of traffic supported in WIAS 100.

Voice and Real-Time Multimedia Support

Among the types of traffic supported, WIAS 100 can handle voice and other real-time multimedia traffic. To handle voice-over-IP (VOIP) traffic, WIAS 100 can use the H.323 protocol framework as described in the ITU-T's H.323 International Telecommunications Union, "Visual Telephone System and Equipment for Local Area Networks which Provides a Non-Guaranteed Quality of Service," Recommendation H.323, Telecommunication Standardization Sector of ITU, Geneva, Switzerland, May 1996, which is designed for real-time, multipoint, multimedia videoconferencing on packet-switched networks, and which supports IP-to-PSTN interworking.

Figure 4:
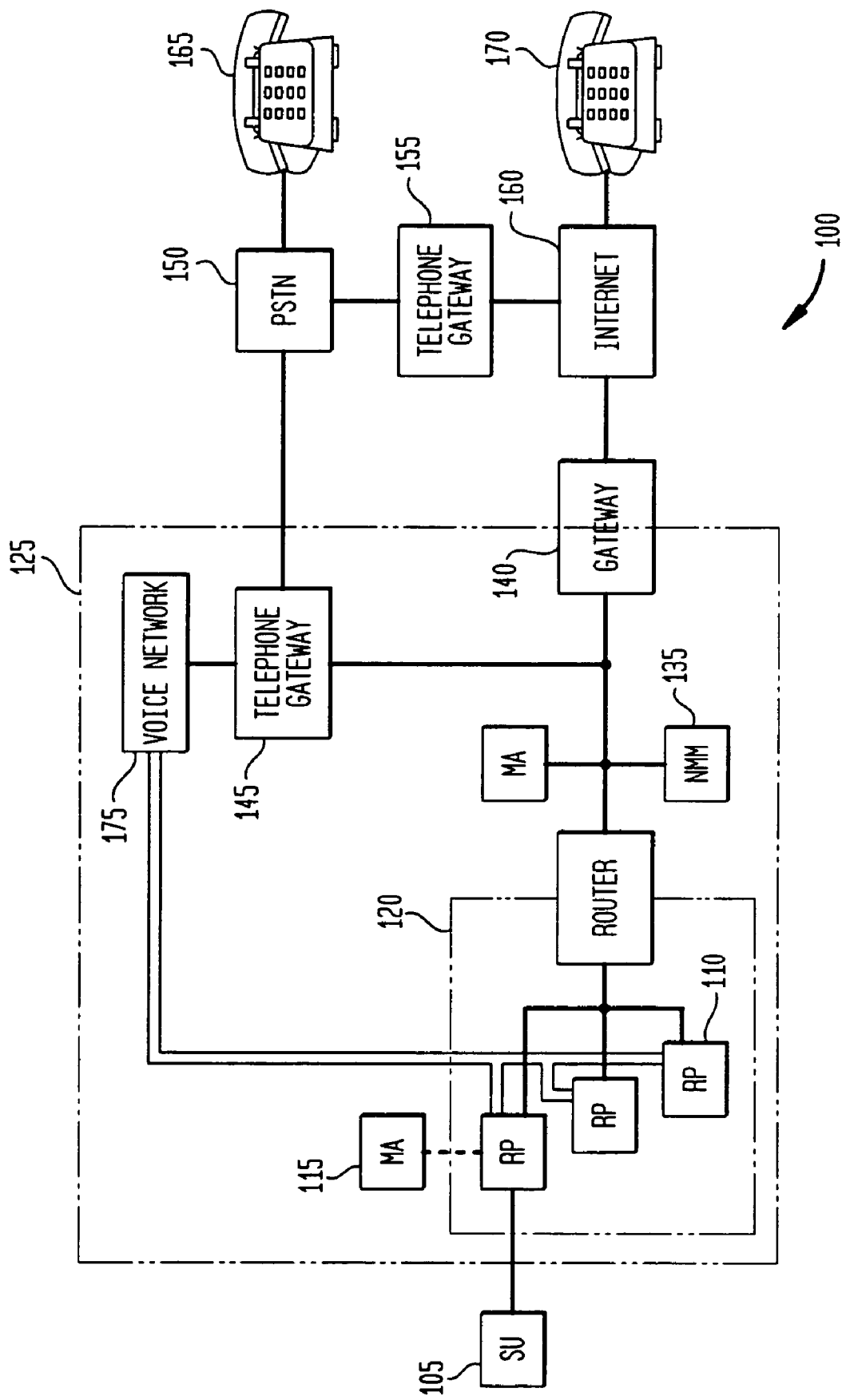
FIG. 4 is a block diagram of the WIAS system of FIG. 1 illustrating different connection scenarios for supporting voice traffic.

As shown in FIG. 4, the invention includes at least two broad categories for supporting voice traffic in WIAS 100. The first category uses a separate voice interface, shown as voice network 175 with direct connection to PSTN 150, such as a multimedia cordless phone scenario. In this case, no Internet connectivity is required for voice, and voice and data are handled separately. Mobility may be supported by the voice network, the 100/10BaseT data network, or both.

Figure 5:
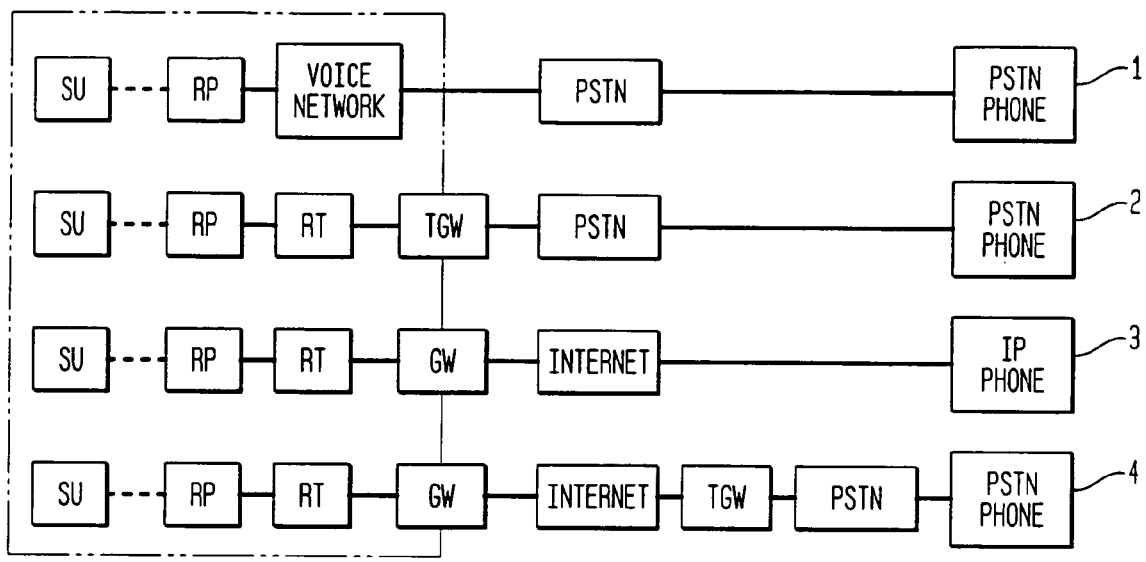
FIG. 5 is a block diagram of a simplified version of FIG. 4 illustrating the different connection scenarios for supporting voice traffic.

The other category for supporting voice traffic in WIAS 100 integrates voice and data on WIAS 100. Multiple scenarios exist for integrating voice and data on WIAS 100, including: (a) a connection from SU 105 to PSTN telephone 165 (PSTNPhone) via an internal telephony gateway (TGW) 145, which provides the network interface between the IP-based WIAS 100 and PSTN 150, with a pass-through connection on voice network 175; (b) a connection from SU 105 to IP telephone 170 (IP-Phone) through the Internet 160 without any PSTN connectivity; and (c) a connection from SU 105 to PSTN-Phone 165 via Internet 160 and an external TGW 155 that interworks Internet 160 with PSTN 150. TGW 145 includes:

These four voice connection scenarios are illustrated in FIG. 5. To implement these voice connection scenarios, WIAS 100 can use the IP-based Real Time Protocol (RTP) H. Schulzrinne et al, "RTP: A Transport Protocol for Real-Time Applications," Request for Comments (Proposed Standard) RFC 1889, Internet Engineering Task Force, December 1997, which handles voice traffic over User Datagram Protocol (UDP) connections. RTP is a thin protocol that provides support for timing reconstruction, loss detection, security, and content identification. The IP-based RTP Control Protocol (RTCP) H. Schulzrinne et al, "RTP: A Transport Protocol for Real-Time Applications," Request for Comments (Proposed Standard) RFC 1889, Internet Engineering Task Force, December 1997, which has been developed to monitor RTP sessions can provide QoS feedback and convey information about participants in the RTP session, which is especially useful when subscribers are participating in an ongoing multimedia session. Both RTP and RTCP can be implemented at the application layer of the H.323 protocol.

Two of the voice connection scenarios in the integrated voice/data category require the transmission of Dual-Tone Multi-Frequency (DTMF) digits network. DTMF signaling is supported over the VOID infrastructure using RTP. On the other hand, H.323 supports the ITU-T defined H.245 connection control protocol running on top of TCP for call connection and control. Thus, H.245 can provide an alternative to RTP for DTMF signaling.

Radio Interface and Logical Channel Structure

Figure 6:
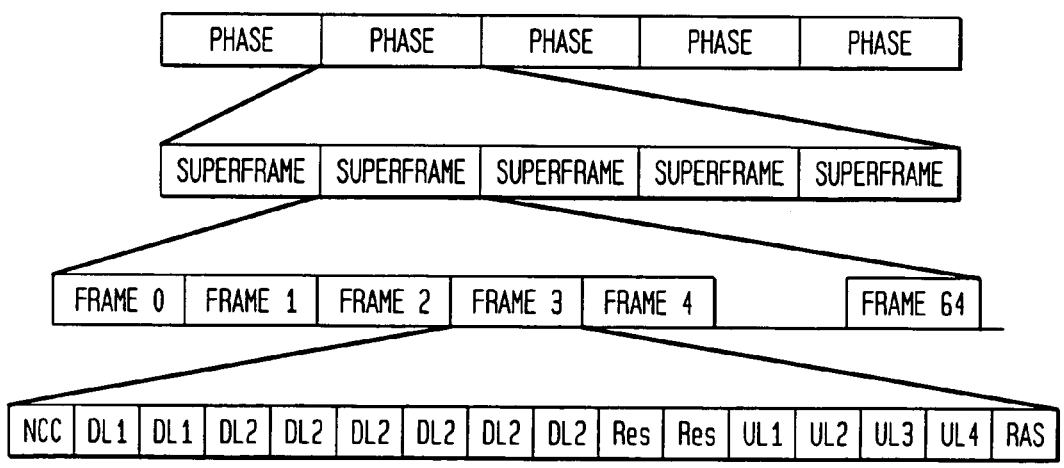
FIG. 6 is a block diagram of a frame structure for transmitting multiple traffic types consistent with the present invention.

WIAS 100 can be implemented as a dynamic time division duplex/time division multiple access (D-TDD/TDMA) system. Such a system uses a non-periodic, variable frame structure. FIG. 6 shows a frame structure for use in WIAS 100 consistent with the present invention. As shown in FIG. 6, data transmissions are each broken up into a series of phases, each phase lasting for a particular period of time, such as 30 seconds. Each phase consists of a number of superframes. For a superframe having a duration of 250 milliseconds (msec), a 30 second phase would include 120 superframes. Each superframe is made up of, for example, 64 frames, which would correspond to approximately 3.9 msec per frame for a 250 msec superframe. Each frame includes a number of time slots, such as sixteen, including both uplink and downlink slots. The number of uplink and downlink slots used in a frame can vary from one superframe to the next.

Each frame must include a downlink node control channel (NCC), which, by definition, starts each frame. The NCC defines the frame format for the phase, including the length and make-up of each frame. In addition, all uplink and downlink time slots are defined in reference to the immediately preceding NCC. The NCC contains paging information, which is used to inform SUs that there are incoming connections directed to a particular SU, as well as channel or slot assignments. The NCC also provides acknowledgments and word error indications (ACKS/WEI) for the uplink slots. At the start of each superframe, the NCC contains a frame descriptor which informs SUs about what types of logical channels are supported by the RP along with the associated time slots. There is only one NCC per frame.

Each frame must also include an uplink random access slot (RAS), which, by definition, ends each frame. The RAS is subdivided into a number of frequency subchannels, each with 32 subcarriers. The first block of subchannels is set aside for downlink acknowledgments (ACK/NAK). Other blocks are set aside for access and registration messages. Access messages are used when an SU requests a UDC (uplink data channel), UVSC (uplink video stream channel), or UMVC (uplink multiplexed video channel), discussed below. Registration messages are used by an SU to announce that it is connected to the network at a particular RP. Both access and registration messages are sent using a set of 32 subcarriers confined to a block which is selected at random to reduce collisions. The RAS is also used by subscriber units to generate uplink time slot requests.

Between the NCC and RAS, a series of time slots can carry a variety of information, as illustrated in Table 1 below. The frame preferably includes all downlink time slots first (from the RP to the SU), followed by uplink time slots. Each time slot is defined by its distance in time from the preceding NCC.

TABLE 1

Logical Channels

| Logical Channel | Description | Traffic |
| --- | --- | --- |
| DDC<br>Downlink Data Channel | The DDC is the basic downlink data channel. Once established, it is dedicated to traffic for a particular subscriber for a specified number of frames. There are typically several DDC slots per frame. This channel supports bulk download data including FTP and large Web downloads. | ABR (available bit rate), VBR (variable bit rate)<br>High Latency<br>High Speed |
| DPSC<br>Downlink Packet Stream Channel | The DPSC is a multiplexed downlink data stream containing data for multiple uses, all of which monitor the streaming channel. Each packet on the DPSC is identified for one of a plurality of listeners. The purpose of this channel is to support short inbound messages | ABR<br>High Latency<br>Low Rate |
| DVSC<br>Downlink Video Stream Channel | The DVSC is essentially the same as the DDC, except that it is assigned with higher priority, meaning that there will be fewer delays incurred. This channel supports high rate data streaming applications, such as video. | CBR (constant bit rate, ABR, VBR<br>Low Latency<br>High Rate |

TABLE 1-continued

Logical Channels

| | | |
|---|---|---|
| DMVC<br>Downlink<br>Multiplexed<br>Voice Channel | The DMVC contains downlink data of multiplexed voice channels. A number N voice calls share the DMVC by using it once every N frames. For example, in a 10.3 MHz implementation, each slot supports 1 Mbps. Then 16 SUs multiplex voice signals onto the DMVC by using it once every 16 frames, providing 32 kbps at $^1/z$ rate coding. Unlike the other channels, a DMVC is always paired with an uplink UMVC. | CBR<br>Low Latency<br>Voice Rate |
| UDC<br>Uplink Data<br>Channel | The Uplink Data Channel is used to support high data rate uplink data traffic with medium to high delay tolerance. UDC slots are assigned to a particular subscriber and last over multiple frames. | ABR<br>High Latency<br>High Rate |
| UVSC<br>Uplink Video<br>Stream Channel | The UVSC provides a low latency, high data rate channel for CBR, ABR, delay sensitive, high data rate streaming data applications, such as video. | CBR, ABR,<br>VBR<br>Low Latency<br>High Rate |
| UPAC<br>Uplink Packet<br>Access Channel | The UPAC channel provides CSMA (carrier sense multiple access) uplink packet service for short uplink messages without the channel setup overhead involved in the UDC | ABR<br>High Latency<br>Low Rate |
| UMVC<br>Uplink<br>Multiplexed<br>Voice Channel | The UMVC is the uplink side of the DMVC. | CBR<br>Low Latency<br>Voice-Rate |

Depending on the type of traffic supported by the RP, the RP may choose to support any combination of DDC, DPSC, DVSC, and DMVC channels on the downlink. On the uplink, the RP can support the UDC, UPAC, UVSC, and UMVC channels. As discussed above, each radio port is preferably implemented to support voice and packet data capabilities. Accordingly, a typical configuration of a frame would use at least one DPSC/UPAC pair and one DMVC/UMVC pair. The remaining 10 time slots in the frame might be allocated to DDC and UDC channels.

The RP is free to change the make up of the frame, including multiplexed voice slots, packet channels, etc., once per 30-second phase. From a fixed total number of DDCIUDC channels, the RP is free to change the fraction allocated to the downlink and uplink once per superframe (250 msec). The RP can also change the DVSCIUVSC ratio at the start of each superframe. Whenever the RP changes the DDC/UPC ratio, DVSCIUVSC ratio or frame make-up, the RP is responsible for ensuring that all affected traffic is seamlessly moved, so that a logical channel that is in-use is not deallocated.

Spectrum Management

Spectrum management in WIAS 100 is based on several overriding principles. First, RPs generate a minimum amount of co-channel interference by transmitting only as necessary. Second, RPs have only a tenuous grip on a frequency channel when its traffic loading is light. Third, RPs have dynamic frequency assignments which can change to accommodate different traffic patterns and different types of interference. RP frequency selection functions are autonomous. Fourth, RPs support random access on the uplink and sleep modes by announcing their presence at well defined periodic intervals. Fifth, RPs can "camp" on the frequency of another inactive RP, in essence sharing its channel. Sixth, two low-activity RPs can share a frequency channel by sacrificing sleep mode capabilities. Finally, SUs do not expect an RP to be present over long periods of time if they are inactive. In other words, if an SU is idle in a cell corresponding to a very lightly loaded RP, the SU will awake from sleep cycles in synchronization with the selected RP; however, if the SU awakes to find that the RP has left the channel, the SU will start to search for a new candidate RP (and possibly find the same RP on another frequency) in an orderly manner.

To obtain a channel of operation, each RP seizes a carrier frequency by scanning a set of channels in a band of operation. The RP then selects a channel of operation which either presents the minimum amount of interference or a power level below a specified threshold. RPs can be instructed to operate in the low, middle, or high U-NII bands, or any combination of these bands. The U-NII bands include the spectrum from 5.150 to 5.350 GHz and from 5.725 to 5.825 GHz, which corresponds to a total spectrum of 300 MHz.

With appropriate modifications, WIAS 100 can be implemented in other bands as well. For example, by complying with Listen-Before-Talk rules, WIAS 100 could be implemented for use in 1910-1920 MHz asynchronous unlicenced PCS bands. Alternatively, WIAS 100 could be used in a private spectrum, including the licenced PCS band (1850-1910 and 1930-1990 MHz). RPs preferably monitor each candidate channel for at least one superframe before selecting a channel of operation.

The process of scanning the channels in a band and selecting a candidate channel is dependent upon the bandwidth with which an RP is operating. If an RP is operating with a 2.6 MHz bandwith, it begins searching for frequencies in the lowest 18 MHz within each 100 MHz band, and only attempts to search outside of this region if there are no acceptable channels in the lowest 18 MHz. Channels are spaced 1.5 MHz apart, with channel number 1 beginning 1.5 MHz from the bottom of the band. Channels 1-11 comprise the initial search set. The total search set can include the entire band, which contains 66 channels (1 . . . 66).

If an RP is operating with a 5.2 MHz bandwidth, it begins searching for a channel between 18 MHz and 51 MHz from the bottom edge of the band. RPs consider two channels at a time, for a search spacing of 3 MHz. The initial search set includes channels, 14, 16, 18, . . . , 32 for 10 possible candidate channels. If an RP cannot find a suitable channel in the initial search set, it may search in other channels, resulting in a total set of 32 channels (2,4,8, . . . ,62,64).

If an RP is operating with a 10.3 MHz bandwidth, it begins searching for a channel between 51 and 100 MHz from the bottom edge of the band. RPs consider 4 channels at a time, for a search spacing of 6 MHz. The initial search set includes seven channels: 38, 42, 46, 50, 54, 58, 62. If the RP does not find a channel within one of these bands, it may search the entire set of 16 channels (2,6,10, . . . ,58,62).

Finally, if an RP is operating with a 20.6 MHz bandwidth, it begins searching for a channel between 51 and 100 MHz from the bottom edge of the band.RPs consider 8 channels at a time, for a search spacing of 12 MHz. The initial search set includes three channels: 42, 50, and 58. If the RP does not find a channel within one of these bands, it may search the entire set of 7 channels (10,18,26,34,42,50,58).

In order to conserve battery life and minimize interference, WIAS 100 incorporates power control. Power control is performed using both open loop and closed loop approaches. In the open loop approach, SUs set their initial transmit power based on received downlink power, so that the SU provides adequate signal strength at the RP receiver. In the closed loop approach, the RP can direct an SU to increase or decrease its power level as appropriate.

In order to support sleep-modes, the NCC recurs at least once per superframe, at the very beginning of the superframe. The NCC is free to transmit pages more frequently than this, but the NCC must transmit pages for all "sleeping" SUs as well as any unresolved pages from the previous superframe, beginning at the start of the next superframe. SUs, regardless of their sleep state, are required to monitor the NCC at the beginning of each superframe, along with subsequent NCCs until the NCC indicates that it has flushed all pending pages.

While WIAS 100 depends on autonomous frequency selection by each RP, the NMM has the ability to instruct any RP to either relinquish its channel, or acquire a specific frequency channel.

All active radio ports, regardless of traffic level, transmit an NCC burst once per superframe. This allows nearby SUs to access uplink channels. When an RP has no traffic for a phase, then it marks itself as idle. Idle RPs continue to transmit one NCC burst per superframe. SUs may register with the RP without it becoming active. The NCC transmitted by an idle RP contains a marker indicating that it is idle. A monitoring RP that cannot find an acceptable frequency channel elsewhere can begin to transmit its NCC on the same carrier used by an inactive RP. If either the incumbent RP or the newly arriving RP becomes active, then the active RP transmits a message over the Ethernet network to the other RP requesting it to give up the channel. Since idle RPs transmit in a periodic fashion (one burst every superframe), each RP that starts to share a channel with other idle RPs should adjust its superframe timing to avoid colliding NCCs on the downlink.

Two active RPs can also share a frequency band through another means. When spectrum is at a premium, the network can disable sleep modes and operate in an aperiodic mode. In this mode, rather than transmitting the NCC once (or more) per superframe, each RP must transmit its NCC no more than 250 msec from the beginning of the previous NCC. Before transmitting any frame, each RP monitors the channel for 200 microseconds (μs). If the channel is not being used, then a frame commences, beginning with the NCC. At the end of the frame, the RP must wait at least 1 msec before attempting to transmit again. Following any unsuccessful transmission attempt, a random, increasing back-off period is imposed in a CSMA/CA fashion. If an RP goes for 250 msec without transmitting the required NCC, then the RP must attempt to locate another frequency on which to operate.

If an RP cannot acquire a channel over an extended period, then the NMM can manually instruct any RP, as required, to perform a controlled shut down. Subsequently, RPs can either acquire frequency channels automatically, or specific channels can be assigned as directed by the NMM.

Physical Radio Channel

Figure 7A:
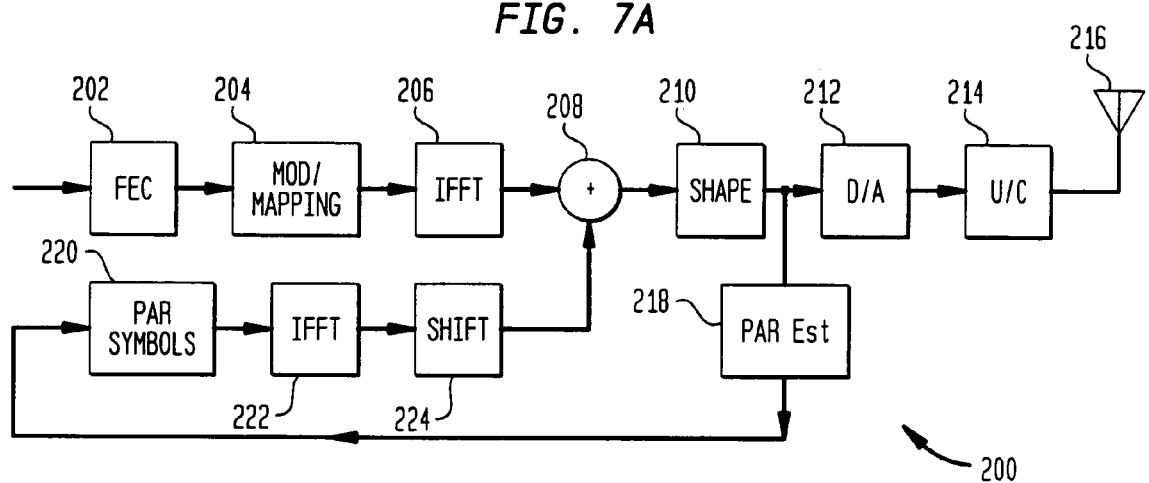
FIGS. 7A and 7B are block diagrams of a transmitter and receiver, respectively, consistent with the present invention.
Figure 7B:
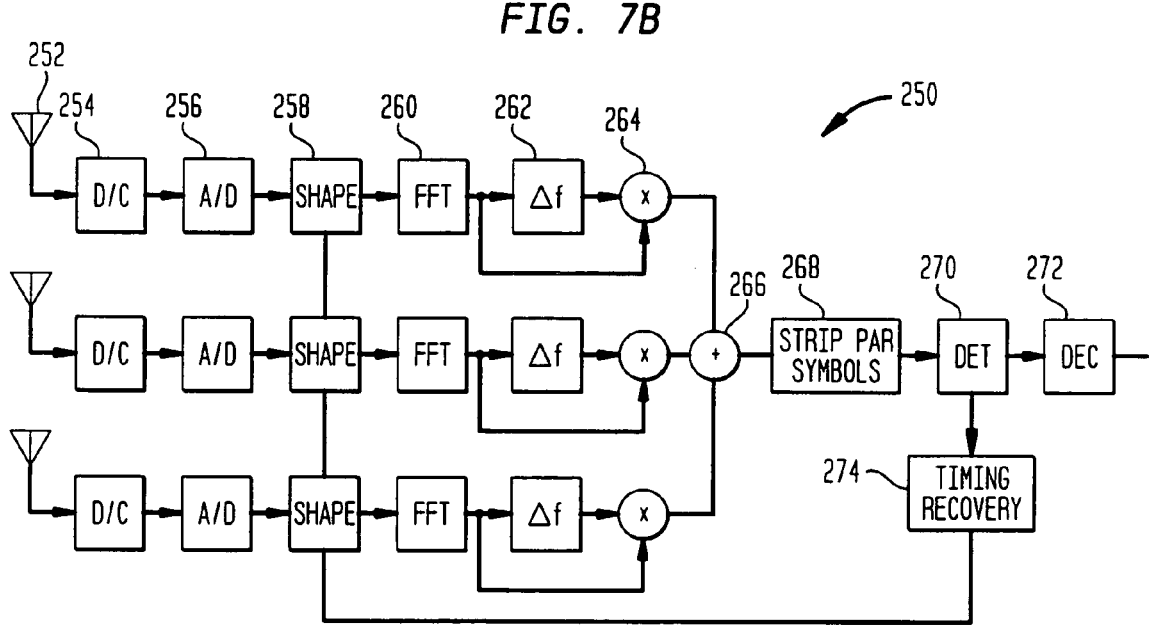

WIAS 100 preferably transmits information between SUs and RPs using Orthogonal Frequency Division Multiplexing (OFDM), which uses a large number of simultaneous subcarriers, each of which is modulated using a low symbol rate. FIGS. 7A and 7B respectively show a block diagram of an OFDM transmitter 200 and an OFDM receiver 250 consistent with the present invention. In the OFDM system, rather than using a high data rate on a single subcarrier, a very low symbol rate is used on a number of subcarriers. The per-subcarrier symbol rate is low enough that time dispersion does not lead to significant inter-symbol interference (ISI).

Figure 8:
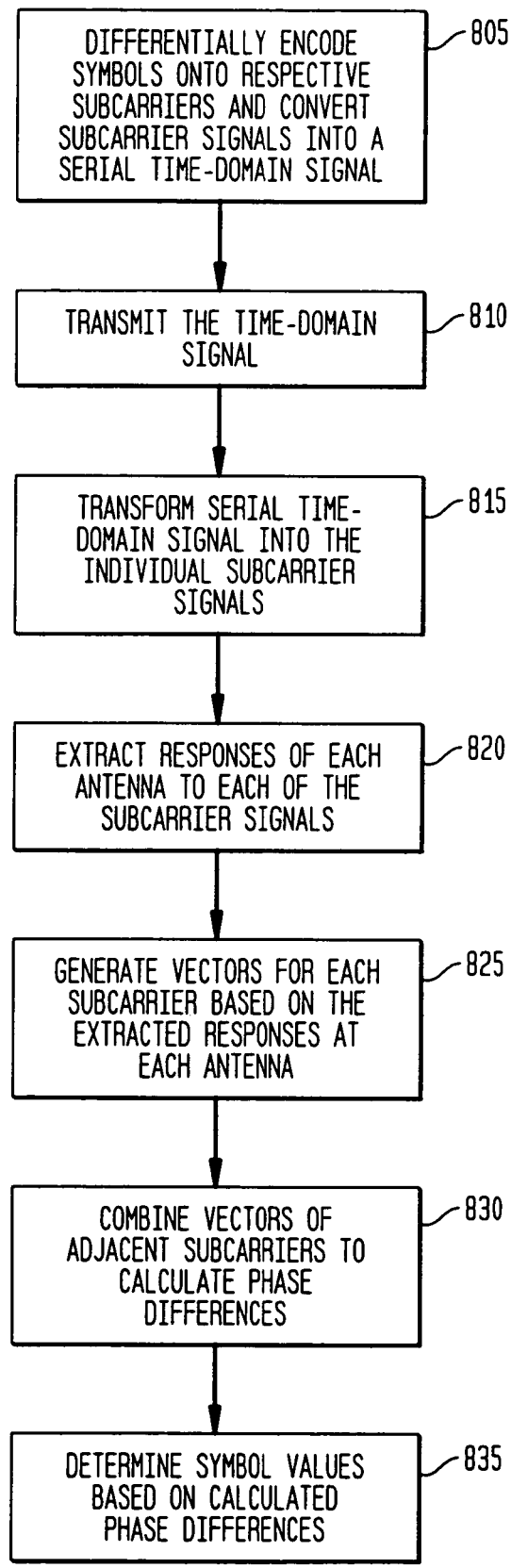
FIG. 8 is a flow diagram of a transmission and reception process consistent with the present invention.

FIG. 8 shows a flow diagram of the operation of the OFDM transmitter/receiver of FIGS. 7A and 7B consistent with the present invention. First, an inverse fast Fourier transform (IFFT) is used to modulate $N_C$ symbols onto N, subcarriers (step 805). The resulting time waveform, which is the superposition of the $N_c$ modulated subcarriers, is upconverted and transmitted over the channel (step 810). At the receiver, a fast Fourier transform (H 1) is used to separate each of the individual subcarriers (step 815).

After separating the subcarriers from the transmitted signal, the response of each of the antenna in the array of antennas is extracted (step 820). A vector is then generated for each subcarrier based on the extracted responses (step 825). Each vector comprises a number of elements equal to the number of receiving antennas. The elements in the vector of a particular subcarrier represent the extracted responses of the receiving antenna to that particular subcarrier.

Using these vectors, the phase difference between each pair of adjacent subcarriers is calculated by performing a mathematical operation, such as the dot product, on the vectors of the adjacent subcarriers (step 830). Once the phase difference between each pair of adjacent subcarriers is known, the symbols which had been used to phase modulate each of the subcarriers can be determined (step 835). The phase encoding of the subcarriers with the symbols and the subsequent decoding of them is described in more detail below.

Since the symbol rate applied to each subcarrier is small, time dispersion in the channel between the RPs and SUs does not lead to ISI. As long as the frequency spread introduced in the channel and by imperfections in the transmitter and receiver is sufficiently small, then individual subcarriers remain roughly orthogonal to one another and can be independently received.

The following is a more detailed description of the operation of the OFDM transmitter 200 and OFDM receiver 250 consistent with the present invention. The baseband complex envelope of the transmitted OFDM signal, i.e., the signal being transmitted between the RPs and SUs, is of the form $$S_t(t) = r(t) \sum_{i=0}^{N_c-1} Z_i e^{j2\pi f_i t} \qquad (1)$$

where r(t) is the pulse shape applied to the transmitted waveform. For typical uplink signals, it is assumed that each burst contains a single OFDM symbol period. In other words, after transmitting a single symbol on each subcarrier, the transmitter does not transmit for some period of time until the next burst. In equation 1, the summation part, shown as summation 208 in FIG. 7A, represents the result of applying the subcarriers and the symbols $Z_i$; to an 11-F1 206 and modulation/mapping 204 in FIG. 7A. This summation is then modified by r(t), which is represented by shape 210. The resulting waveform is then converted to an analog signal by digital-to-analog (D/A) converter 212, upconverted by U/C 214, and transmitted by antenna 216.

The symbols $Z_i$, which represent the data being transmitted, are used to phase modulate each subcarrier using differential encoding, such as frequency domain differential quadrature phase shift keying (FD-DQPSK). The symbols $Z_i$; are of the form $$Z_i = e^{j\phi_i} \tag{2}$$

and $\Phi_i$ is of the form $$\phi_i = \frac{\pi(2n+1)}{M} \tag{3}$$

for n=0 . . . M−1, where M is the number of phase levels used in differential encoding. Thus, in FD-DQPSK, M=4 and the different phase levels would be ($\Phi i \in \{\pi/4, 3\pi/4, -\pi/4, -3\pi 4\}$. Each pair of bits is then encoded as the difference between the phases of two adjacent carriers, ($\Phi_i$-$\Phi_{i-1}$). The minimum spacing between carriers is equal to $1/T_S$, where $T_S$ is the length of the time window used to sample the signal at the receiver.

When transmitting the phase modulated signals over the channel between the SUs and RPs, the SUs and RPs may use multiple antennas to receive the transmitted signal. Having a multipath channel, however, can lead to distortion of the received signal. Since the SUs and RPs in WIAS 100 preferably use multiple receiving antennas, shown as antennas 252 of receiver 250 in FIG. 7B, the following vector model of the time-varying, time-dispersive multipath channel can be used, $$h(t, \lambda) = \sum_{l=0}^{N_L-1} a(\theta_l)\alpha_l \delta(t - \tau_l) e^{j(2\pi\rho_l\lambda + \gamma_l)} \tag{4}$$

Each element of the vector h(t,λ) represents the channel between the transmitter and one element of the receiving array. The model uses $N_L$ discrete paths from the transmitter to the receiver, each of which takes the form of a single plane wave at the receiving array. Each component is characterized by its direction-of-arrival (DOA), $\Theta_1$, the scalar path gain, $\alpha_1$, the path delay relative to the first arriving path, $r_1$ the Doppler shift, $\rho_1$, and the additional fixed phase factor, $\gamma_1$. The vector $a(\Theta_1)$ is the steering vector which represents the response of the array to a plane wave incident from direction $\Theta_1$.

All of the delays are normalized so that the delay of the first arriving component is $r_0$=0. The received signal at the array is may be represented as follows:

$$u(t) = s(t) * h(t, \lambda) + n(t) \tag{5}$$

$$= \sum_{i=0}^{N_c-1} \sum_{l=0}^{N_L-1} Z_i a(\theta_l)\alpha_l r(t - \tau_l) e^{j(\gamma_l + 2\pi(f_i+\rho_l)(t-\tau_l))} + n(t)$$

where each element of u(t) represents the signal received by one of the antennas 252 among the array of antennas. It is assumed that the pulse shape varies very slowly with respect to the delays of the multipath components so that the received signal can be written as:

$$= s(t) * h(t, \lambda) + n(t) \tag{6}$$

$$= r(t) \sum_{i=0}^{N_c-1} Z_i e^{j2\pi f_i t} \sum_{l=0}^{N_L-1} a(\theta_l)\alpha_l e^{j(\gamma_l - 2\pi(f_i+\rho_l)\tau_l + 2\pi\rho_l t)} + n$$

As shown in FIG. 7B, the signal received by each of the antennas 252 is down converted by D/C 254, converted to a digital signal by A/D converter 256, and pulse-shaped by shape 258. In addition, the signal received at each antenna is then separated into each subcarrier by NH 260. To extract the symbol from a subcarrier, a vector $v_k$ is formed using delta function 262, multiplier 264, and summer 266. The vector $v_k$ represents the response of the array of antennas 252 to subcarrier k:

$$V_k = \int_{-T_w/2}^{T_w/2} u(t)r(t)e^{-j2\pi f_k t} dt \tag{7}$$

Each element of vector $v_k$ represents the response of one of the antennas in the array to subcarrier k. Because there is a non-zero ramp-up and ramp-down time associated with the subscriber amplifier and in order to minimize inter-subcarrier interference, r(t) can be written as a square root raised cosine pulse shape (the time analog of the pulse shaping represented by shape 210 in FIG. 7A), $$r(t) = \begin{cases} \sqrt{\frac{1}{2} + \frac{1}{2}\cos\left(\pi\frac{|t|-T_s/2+\Delta t}{2\Delta T}\right)} & |t| < T_s/2 - \Delta T \\ & T_s/2 - \Delta T < |t| < T_s/2 + \Delta T \\ & |t| > T_s/2 + \Delta T \end{cases} \tag{8}$$

where $T_W = T_s + 2\Delta T$. Then $$\int_{-T_w/2}^{T_w/2} |r(t)|^2 e^{j2\pi ft} dt = T_s \cdot \frac{\sin(\pi f T_s)}{\pi f T_s} \cdot \frac{\cos(2\pi f \Delta T)}{1-(4f\Delta T)^2} \tag{9}$$

For small Doppler shifts such that $\rho_1 << 1/T_s$ the Vector $V_k$ can be represented as follows:

$$V_k = Z_k \sum_{i=0}^{N_L-1} a(\theta_l)\alpha_l e^{j(\gamma_l - 2\pi(f_k+\rho_l)\tau_l)} + \tilde{n}_k \tag{10}$$

Once the vector $v_k$ has been formed, the phase difference between adjacent subcarriers can be calculated using detector 270. A computationally simple technique, [described in J. C. Liberti, "Techniques for Applying Smart Antennas to Orthogonal Frequency Division Multiplexing (OFDM)," Bellcore Engineer's Notes, October 1997, for demodulating multi-sensor frequency-differential signals which is incorporated herein by reference,]is to form the inner product between $v_k$ for successive sub-carriers. This approach is analogous to the time-domain differential demodulator that multiplies successive time symbols to estimate the phase between symbols. For FD-OFDM signals, the carrier-to-carrier phase shift is estimated by multiplying spatial vectors for successive carriers together.

$$\gamma_k = v_k^H v_{k-1} \quad (11)$$

$$= Z_k^* Z_{k-1} \sum_{l=0}^{N_L-1} \sum_{p=0}^{N_K-1} a^H(\theta_p) \alpha_p e^{-j(\gamma_p - 2\pi(f_k + \rho_p) r_p)}$$

$$a(\theta_l) \alpha_1 e^{j(\gamma_l - 2\pi(f_{k-1} + \rho_l) r_l)} +$$

$$n_k^H Z_{k-1} \sum_{l=0}^{N_L-1} a(\theta_l) \alpha_l e^{j(\gamma_l - 2\pi(f_{k-1} + \rho_l) r_l)} +$$

$$Z_k \sum_{l=0}^{N_L-1} a^H(\theta_l) \alpha_l e^{-j(\gamma_l - 2\pi(f_k + \rho_l) r_l} \tilde{n}_{k-1} + \tilde{n}_k^H \tilde{n}_{k-1}$$

Taking the expected value of $Y_k$, which represents the phase difference between adjacent subcarriers, over the set of phase angles $\{\lambda_1\}$ and over the noise vectors $\tilde{n}_k$ results in $$E_{\gamma' n}\{Y_k\} = Z_k^* Z_{k-1} M \sum_{l=0}^{N_L-1} \alpha_l^2 e^{j2\pi \Delta f r_l} \quad (12)$$

$$= e^{-j(\phi_k - \phi_{k-1})M \sum_{l=0}^{N_L-1} \alpha_l^2 e^{j2\pi \Delta f r_l}}$$

In practice, however, the phases of individual carriers do not interact in a random manner for any particular OFDM burst, which can lead to fading. Alternatively, assuming a uniform distribution of DOAs, the expected value of $Y_k$ can be taken over all directions-of-arrival as follows:

$$E_{\theta,n}\{Y_k\} = M Z_k^* Z_{k-1} \sum_{l=0}^{N_L-1} \alpha_l^2 e^{j2\pi \Delta f r_l} + \quad (13)$$

$$\psi(M) Z_k^* Z_{k-1} \sum_{l=0}^{N_L-1} \sum_{\substack{p=0 \\ p \neq 0}}^{N_L-1} \alpha_p e^{-j(\gamma_p - 2\pi(f_k + \rho_p))} \alpha_p e^{j(\gamma_l - 2\pi(f_{k-1} + \rho_l) r_l)}$$

For a linear equally-spaced array, $$\Psi(M) = \sum_{l=0}^{M-1} J_o^2\left(\frac{2\pi}{\lambda} i \Delta x\right) \quad (14)$$

For M=2, 4, 6, and 8, with $\Delta x = \lambda/2$, $\Psi(M)$ is 1.09, 1.17, 1.21, and 1.24 respectively. When $M \gg \Psi(M)$, the cross product terms in equation 13 can be ignored giving the same result as equation 12. Therefore, although the set of phases and DOAs are fixed and non-random over any particular burst, both the phase interactions and the distribution of DOAs will tend to minimize the contribution of the cross product terms to $Y_k$. Therefore, $Y_k$ is approximated using $$'k \approx Z_k^* Z_{k-1} \sum_{l=0}^{N_L-1} a^H(\theta_l) a(\theta_l) \alpha_l^2 e^{j2\pi (f_{k-1}) r_l} + \varepsilon \quad (15)$$

$$= e^{-j(\phi_k - \phi_{k-1})M \sum_{l=0}^{N_L-1} \alpha_l^2 e^{j\pi \Delta f \eta} + \varepsilon_k}$$

where $$\epsilon_k = \tilde{n}_k^H \tilde{n}_{k-1} \quad (16)$$

Since the information is encoded using the difference between the phase of successive symbols, $Y_k$ is a decision variable for the modulation scheme.

When the approximation of equation 15 holds (i.e. using one of the two justifications provided), this approach is resistant to multipath, and the only remaining distortion from the multipath channel is introduced through the subcarrier-to-subcarrier differential rotation caused by the multipath component delay $T_l$. For example, for a subcarrier separation of 5 kHz, if the maximum component delay (relative to the first arriving component) is less than 5.5 ps, then the phase of the exponential term in the summation will be less than 10° so the sum of multipath components in equation 15 is mostly real. Then, $Y_k$ is approximated using $$Y_k \approx e^{j(\phi_k \phi_{k-1})} M \sum_{l=0}^{N_L-1} \alpha_l^2 + \varepsilon_k \quad (17)$$

When the phases of the summed terms in equation 15 are not close to zero, $Y_k$ is a biased estimator, even when the noise is negligible. The detector of (10) can be modified slightly to account for sampling offsets using:

$$Y_k = V_k^H v_{k-1} e^{-j2\pi \Delta f T_o} \quad (18)$$

$$\approx e - j(\varphi_k - \varphi_{k-1}) M \sum_{l=0}^{N_L-1} \alpha_l^2 e^{j2\pi \Delta f (r_l - T_o)} + \varepsilon_k e^{-j2\pi \Delta f T_o}$$

Note, however, that this method requires a search of the received signal for the value of $T_0$, which provides the best decision metric.

$$Y_k = V_k^H v_{k-1} e^{-j2\pi \Delta f T_o} \quad (19)$$

$$\approx e - j(\varphi_k - \varphi_{k-1}) M \sum_{l=0}^{N_L-1} \alpha_l^2 e^{j2\pi \Delta f (r_l - T_o)} + \varepsilon_k e^{-j2\pi \Delta f T_o}$$

The technique described here is used for the uplink in WIAS 100. The downlink in WIAS 100 uses a similar technique, however a cyclic prefix is appended to each burst. The cyclic prefix may be implemented by prepending a transmitted data symbol with appropriate samples from the end of the symbol so that the resulting waveform is the circular convolution of the channel impulse response with the transmitted data, thus simplifying the FFT processing at the receiver.

This approach has been shown to yield results which are within 2 dB of optimal multi-sensor combining for additive white gaussian noise (AWGN) channels, and can outperform Minimum Mean Square Error (MMSE) single-tap beamforming in multipath channels. The approach also performs well when timing and frequency errors are present. However, the key advantage to the non-coherent combiner described above is that it requires no training, and works well on bursty data, without requiring burst-toburst tracking. Thus, it is well suited to all data types supported by WIAS 100.

To illustrate how the differential encoding and decoding operates, consider the case of a six subcarrier differential QPSK OFDM system. Assume that the data to be transmitted is $\{S_k\}=\{1,0,0,1,1,0,0,0,0,1\}$. The first step is to divide the data into pairs of bits, and then to map this data into phase differences according to Table 2.

TABLE 2

Differential encoding of data, assuming $\Phi_0 = \pi/4$

| Subcarrier | Input Data | $\Delta\Phi_1$ | $\Phi_1$ |
|---|---|---|---|
| 1 | 1 0 | $\pi$ | $-3\pi/4$ |
| 2 | 0 1 | $\pi/2$ | $-\pi/4$ |
| 3 | 1 0 | $\pi$ | $3\pi/4$ |
| 4 | 0 0 | 0 | $3\pi/4$ |
| 5 | 0 1 | $\pi/2$ | $-3\pi/4$ |

The phase values, $\{\Phi_1\}$, are used to obtain the modulating symbols $Z_i=e^{j\Phi i}$, which determine the transmitted waveform described by equation 1. At the receiver, the phase values, $\{(D;\}$, are recovered as described by equations 11 through 18 as follows: I'D;$\}=\{i\pi/4, -3i\pi/4, -7\pi/4, 37\pi/4, 37\pi/4, -37[/4\}$.

Knowing that $\Phi_0.\pi/4$ and $\Delta\Phi_1=\Phi i-\Phi_{i-1}$, the set of differential phase shifts can be recovered as: $\{\Delta\Phi_1\}=\{X, \pi, \pi/2, \pi, 0, \pi/2\}$, where the "X" represents that $\Phi_0$ is not dependent on any previous phase. Using $\Delta\Phi_1, \ldots, \Delta\Phi_5$, together with Table 2, the estimated received bits are found to be $\{S_{k(received)}\}=\{1, 0,0,1,1,0,0,0,0,1\}$.

Because there is no noise or distortion in the channel to corrupt the received signal, the transmitted bit have been received and recovered without error.

Differential encoding has several advantages over non-differential modulation. First of all, since the data is entirely encoded as the difference between successive symbols, there is no need to use carrier recovery techniques to estimate the absolute phase of the each symbol. In addition, since the encoding of data depends only on the phase difference between successive subcarriers, the modulation technique is robust to phase variations introduced by the channel. Phase variations due to the channel may be significant over the entire bandwidth of the signal ($N_c\Delta f$), but are likely to be small from one subcarrier to the next. Differential encoding also provides an efficient technique to combine signals from multiple antenna elements in a nearly optimal manner.

Although differential encoding performs slightly worse than non-differential encoding over AWGN channels, the difference is less pronounced in multipath channels. In addition to the M=4 modulation scheme used in the above example, differential phase shift keying systems with M=16 are commonly used. Also, in OFDM systems, the number of subcarriers, $N_C$, can be much larger than the six subcarriers used in the above example. Typical values range from 64 to 1024 subcarriers. For example, if the channel of operation is 5.15 GHz and the number of subcarriers is 64 with a separation of 5 KHz, the subcarriers would range from 5.15 GHz for the first subcarrier to 5.15 GHz+315 KHz for the last subcarrier.

A problem common to all OFDM schemes is the issue of peak-to-average power ratio (PAR), also called the crest factor(as described by R. A. Ziegler in "Reducing Peak Envelope Fluctuations in Multicarrier Modulation," Bellcore Engineer's Notes, February, 1995, which is incorporated herein by reference. Using QPSK subcarrier modulation, the total energy in each burst will be a constant value regardless of the modulating data. However, the peak instantaneous power of the burst, if unaddressed, can be as much as N, times the average power of the burst. The average power is defined as the energy per burst divided by the burst duration. Since $N_c$ is large, this can produce unacceptably high peak power values, resulting in distortion of the transmitted signal unless extremely expensive, high dynamic range transmit amplifiers are used, which tend not to be power efficient.

To address this problem, each burst sets aside $N_P$ subcarriers for crest factor reduction (CFR). Systematic algorithms to find optimal sets of $N_P$ carriers, which result in a minimum PAR, are not easily implemented. In addition, it is not strictly necessary to find a set of subcarriers which provides the minimum PAR, just an acceptable subcarrier. Accordingly, a random search technique is used. In this method, $N_c$-$N_P$ data subcarriers are used with $N_P$ PAR subcarriers, using a set of $N_p$ modulating symbols, $\{X_1\}$, for the partitioned CFR subcarriers. The OFDM burst can be expressed as the sum of contributions from the data symbols and contributions from the CFR subcarriers as follows:

$$s_t(t) = r(t)\sum_{i=0}^{N_c-N_p-1} Z_i e^{j2\pi f_i t} + r(t)\sum_{i=N_c-N_p}^{N_c-1} X_{i-N_p} e^{j2\pi f_i t} \quad (19)$$

$$= r(t)IDFT_{N_c-N_p}(Z_i) + r(t)e^{j2\pi(N_c-N_p)}\sum_{i=0}^{N_p-1} X_i e^{j2\pi f_i t} \ldots$$

$$= r(t)IDFT_{N_c-N_p}(Z_i) + r(t)e^{j2\pi(N_c-N_p)}IDFT_{N_p}(X_i)$$

$$= s_d(t) + s_p(t)$$

The data portion of the modulated signal, $s_d(t)$, is computed once for each set of data symbols $\{Z_1\}$ to be transmitted over the air. A random set of values $\{N.\}$ is drawn from a QPSK symbol set, and $s_p(t)$ is computed. The Peak-to-Average power Ratio is computed for the resulting burst, $s_t(t)$. If the PAR is less than $T_{PP}$, then the set of PAR reduction symbols, (X1), are accepted and $s_t(t)$ is transmitted. If the PAR is greater than the threshold $T_{PP}$, then a new set of $\{X_i\}$ is selected and the process is repeated. The set of $\{X_i\}$ which gives the minimum PAR over the search set is always maintained. If no suitable set of $\{X_i\}$ is found within $N_{PP}$ iterations that provides a PAR less than $T_{PP}$, then the set of $\{X_1\}$ which provided the minimum PAR is used. This functionality is provided by PAR estimator 218, PAR symbols 220, IFFT 222 and Shifter 224 in transmitter 200 of FIG. 7A. In addition, the reverse or stripping out of this function is performed by strip PAR symbols 268 in receiver 250 of FIG. 7B.

Table 3, below, shows suggested system specifications from WIAS 100 for the different channel bandwidths. These system specifications are merely preferences, and should not be construed as limiting or unchangeable.

TABLE 3

Variable bandwidth WIAS system specifications.

| Channel Bandwidth | 2.6 MHz | 5.2 MHz | 20.6 MHz | 20.6 MHz |
|---|---|---|---|---|
| Burst Length | 200 μs | 200 μs | 200 μs | 200 μs |
| Typ Max Frame Length | 3.906 ms | 3.906 ms | 3.906 ms | 3.906 ms |
| Subcarriers/Burst | 512 | 1024 | 2048 | 4096 |
| CFR Subcarriers/Burst | 32 | 64 | 128 | 256 |
| Bits/Burst | 960 | 1920 | 3840 | 7680 |
| Information Bits/Burst Using (3, 2, 6) Covolutional Code | 628 | 1268 | 2548 | 5108 |
| Identification/WEI Bits | 116 | 116 | 116 | 1012 |
| Payload Bits/Frame | 512 | 1152 | 2432 | 4992 |
| Maximum Number of Time Slots/Frame | 16 | 16 | 16 | 16 |
| Max User Bit Rate per Time Slot (DDC, UDC) | 128 kbps | 288 kbps | 608 kbps | 1248 kbps |
| Max Number of User-Time Slots/Frame | 14 | 14 | 14 | 14 |
| Number of Voice Calls per MVC Pair (ADPCM/PCM) | 4/2 | 8/4 | 16/8 | 16/16 |
| Number of Frames to Transmit One 1500 Byte IP Packet | 24 | 11 | 5 | 3 |
| Maximum Single User DDC/UDS Data Rate, Aggregating 14 slots | 1.8 Mbps | 4.0 Mbps | 8.5 Mbps | 17.5 Mbps |
| Carrier Separation | 3 MHz | 6 MHz | 12 MHz | 24 MHz |
| Channels | 33 in each 100 MHz U-NII Band | 16 in Each 100 MHz U-NII Band | 16 in Each 100 MHz U-NII Band | 16 in Each 100 MHz U-NII Band |

As shown in Table 3, not all terminals support all data rates. In particular, portable subscriber terminals may only support 2.6 and 5.2 MHz bandwidths. Typically, low cost, desktop systems can support up to 10.3 MHz, and links requiring substantial bandwidth can support 20.6 MHz bandwidth.

Radio Functional Architecture

Figure 9:
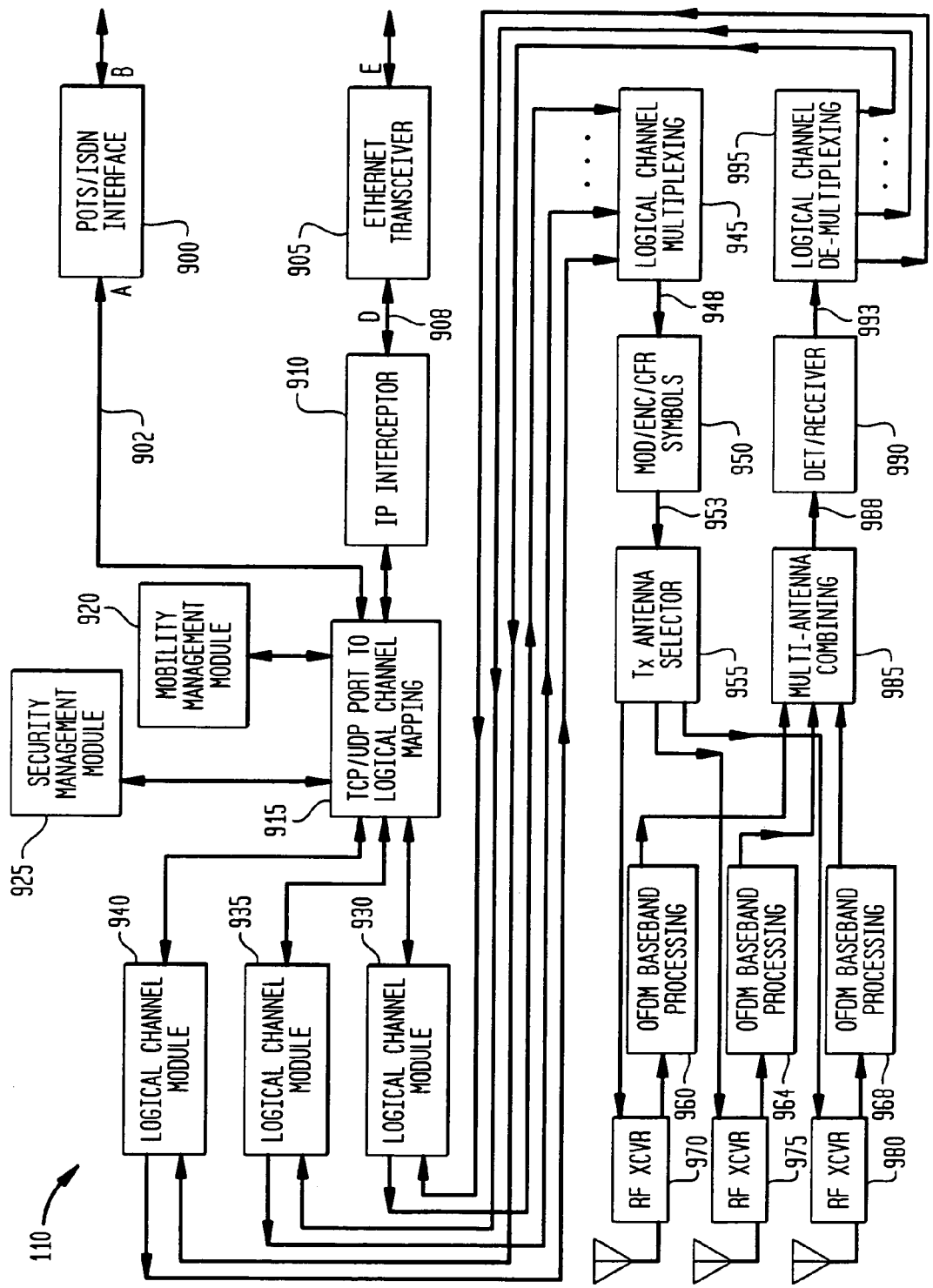
FIG. 9 is a block diagram of a radio port in the WIAS system of FIG. 1 consistent with the present invention.

FIG. 9 shows a block diagram of RP 110 consistent with the present invention. RP 110 comprises a POTS/ISDN Interface Module 900, an Ethernet Transceiver 905, an IP Interceptor 910, a plurality of TCP/UDP Port to Logical Channel Mapping Modules (TUPLCM) 915, a Mobility Management Module 920, a Security Management Module 925, Logical Channel Modules (LCM) 930, 935, and 940, a Logical Channel Multiplexing Module 945, a Modulation/Encoding/Crest Factor Reduction Symbols Module (MECFR) 950, a Transmitter Antenna Selector 955, OFDM Baseband Processing Modules 960, 964, and 968, RF Transceivers (RF XCVR) 970, 975, and 980, a Multi-Antenna Combining Module 985, a Detector/Receiver 990, and a Logical Channel De-Multiplexing Module 995.

POTS/ISDN Interface Module 900 maps an input serial data stream to an output data stream 902 that may include a modulation data stream that can be transmitted over a POTS line or a digital data stream that can be transmitted over an ISDN line. The output data stream 902, which is received by TUPLCM 915, may be bi-directional for either POTS or ISDN modes.

Ethernet Transceiver 905 maps data from an Ethernet cable to a serial data stream 908, which includes Internet Protocol (IP) packets and is received by IP Interceptor 910. IP Interceptor 910 then routes the IP packets in serial data stream 908 to TUPLCM 915. Each TUPLCM 915, which is associated with a subscriber, receives either the routed serial data stream 908 or data stream 902 and routes the traffic to individual LCMs 930, 935, and 940. TUPLCM 915 associates each LCM 930, 935, and 940 with a different TCP or UDP port number. TUPLCM 915 may be implemented as an object using software. As such, TUPLCM 915 may be created and deleted as needed to match the number of active subscribers currently associated with each RP.

Mobility Management Module 920 maps Care-Of IP addresses to actual IP addresses to support mobile IP. Security Management Module 925 performs authentication to ensure that a subscriber attempting to access WIAS 100 is authorized.

Each LCM 930, 935, and 940 includes a first bi-directional input port that connects to the TUPLCM 915. This first input port supports data for a particular TCP/UDP port associated with a particular subscriber. The data flowing into the first input port is buffered for transmission through an output port. Each LCM 930, 935, and 940 also includes a second input port that connects to Logical Channel Multiplexing Module 945.

Serial data at the second input port is buffered for transmission to TUPLCM 915 via the first input port. Each LCM 930, 935, and 940 buffers delay-tolerant transmitted data from the first input port until a proper automatic repeat request (ARQ) response is received from the subscriber. If a negative acknowledgment (NAK) is received, then each LCM 930, 935, and 940 re-transmits the buffered data through the output port. Preferably, delay-sensitive data, such as voice, may not be buffered. Similar to TUPLCM 915, LCMs 930, 935, and 940 may be implemented as objects using software so that each LCM 930, 935, and 940 can be created or deleted easily to support data streams for each subscriber.

Logical Channel Multiplexing Module 945 receives data streams from the outputs of LCM 930, 935, and 940, and multiplexes the data streams onto a single data stream 948, which is received by MECFR 950. The amount of data taken from each data stream is matched to the number of bits contained in the data burst for each data type.

MECFR 950 groups sets of bits in the data stream 948 and generates as output a data stream 953. MECFR 950 adds to the data stream 948 Forward Error Control (FEC) encoding to control errors and Crest Factor Reduction (CFR) bits to minimize the peak-to-average ratio of the transmitted data symbols, thus reducing the required dynamic range of RP 110 and improving transmission efficiency. MECFR 950 groups together blocks of encoded bits, and performs an inverse fast Fourier transform (IFFT) on the data stream 948 to form Orthogonal Frequency Division Multiplexing (OFDM) symbols. Transmitter Antenna Selector 955 then maps the resulting data stream 953 onto one of RF XCVR 970, 975, and 980.

Each XCVR 970, 975, and 980 includes a digital input, a digital output, and an antenna port. Each XCVR 970, 975, and 980 converts digital data from the input into an analog signal, modulates onto an RF carrier, amplifies, filters, and transmits the resulting signal through the antenna port. Data received from each antenna is filtered, amplified, down-converted, digitized, and made available at the output.

Each OFDM Baseband Processing Module 960, 964, and 968 receives digitized symbols from the output of one XCVR 970, 975, and 980, extracts timing information, using a fast Fourier transform (Fr 1'), extracts the symbols modulated onto each individual subcarrier, and generates an output data stream.

Multi-Antenna Combining Module 985 receives the output data stream generated by each OFDM Baseband Processing Modules 960, 964, and 968, and using the differential OFDM multiple antenna combining technique described earlier, generates a single combined data stream 988.

Detector/Receiver 990 converts the symbols in the data steam 988 into a binary digital data stream, and removes Crest Factor Reduction (CFR) bits and error control encoding bits in the data stream 988, resulting in a data stream 993. Logical Channel De-Multiplexing Module 995 then receives and routes the binary digital data stream 993 to the second inputs of LCMs 930, 935, and 940.

Figure 10:
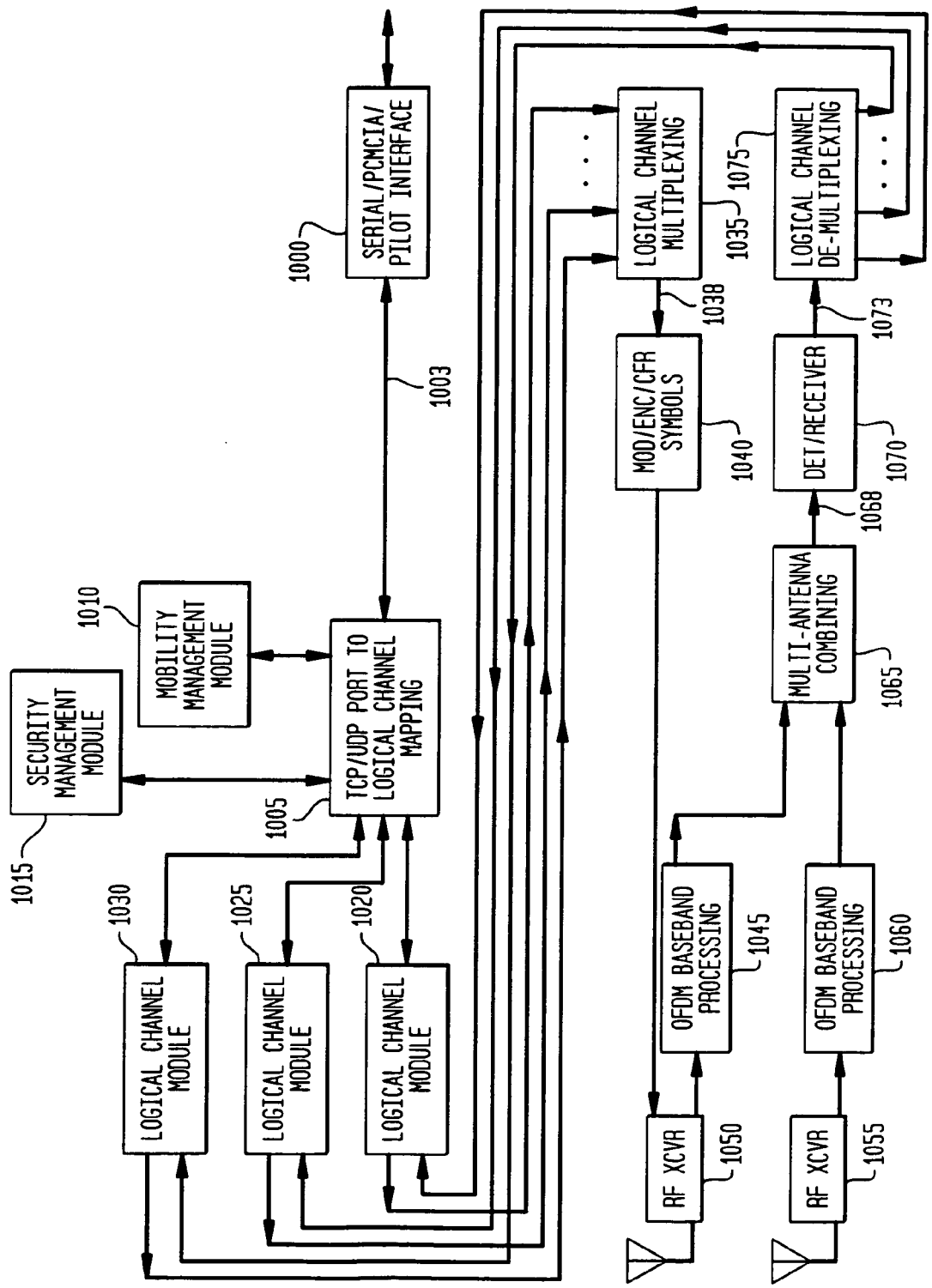
FIG. 10 is a block diagram of a subscriber unit in the WIAS system of FIG. 1 consistent with the present invention.

FIG. 10 shows a block diagram of SU 105 consistent with the present invention. SU 105 comprises a Serial/PCMCIA/Pilot Interface 1000, a plurality of TCP/UDP Port to Logical Channel Mapping Modules (TUPLCM) 1005, a Mobility Management Module 1010, a Security Management Module 1015, Logical Channel Modules 1020, 1025, and 1030, a Logical Channel Multiplexing Module 1035, a Modulation/Encoding/Crest factor Reduction Symbols (MECFR) 1040, RF Transceivers (RF XCVR) 1050 and 1055, OFDM Baseband Processing Modules 1045 and 1060, a Multi-Antenna Combining Module 1065, a Detector/Receiver 1070, and a Logical Channel De-Multiplexing Module 1075.

Serial/PCMCIA/Pilot Interface 1000 interfaces with a physical interface corresponding to that of an RS-232 serial port, PCMCIA card, 3com Palm Pilot interface, or any other similar interface, and generates an IP packet data stream 1003.

TUPLCM 1005 receives and routes the IP packet data stream 1003 to one of LCMs 1020, 1025, and 1030. TUPLCM 1005 associates each LCM 1020, 1025, and 1030 with a different TCP or UDP port number.

Mobility Management Module 1010 maps Care-Of IP addresses to actual IP addresses to support mobile IP. Security Management Module 1015 performs authentication to ensure that a subscriber attempting to access WIAS 100 is authorized.

Each LCM 1020, 1025, and 1030 includes a first bi-directional port connects to TUPLCM.1005. This interface supports data for a particular TCP/UDP port. The data stream flowing into the first port is buffered for transmission through a second port. Serial data received from Logical Channel Multiplexing Module 1035 via a third port is buffered for transmission to TUPLCM 1005 via the first port. Each LCM 1020, 1025, and 1030 buffers delay-tolerant transmitted data from the first port until the proper automatic repeat request (ARQ) response is received from the subscriber. If a negative acknowledgment (NAK) is received, then each LCM 1020, 1025, and 1030 re-transmits buffered data at the second port. Preferably, delay-sensitive data, such as voice, may not be buffered. Each LCM 1020, 1025, and 1030 may be implemented in software.

Logical Channel Multiplexing Module 1035 receives data streams from the second ports of LCM 1020, 1025, and 1030, and multiplexes these data streams onto a single data stream 1038. The amount of data taken from each data stream is matched to the number of bits contained in the data burst for each data type.

MECFR 1040, which receives the data stream 1038, groups sets of bits in the data stream 1038, and adds Forward Error Control (FEC) encoding to control errors and Crest Factor Reduction (CFR) bits to minimize the peak-to-average ratio of the transmitted data symbols, thus reducing the required dynamic range of SU 105 and improving transmission efficiency. Blocks of encoded bits are grouped together, and an inverse fast Fourier transform (IFFT) is performed on the data stream 1038 to form Orthogonal Frequency Division Multiplexing (OFDM) symbols. MECFR 1040 then routes the resulting data stream to RF XCVR 1050.

Each RF XCVR 1050 and 1055 includes a digital input, a digital output, and an antenna port. Each RF XCVR 1050 and 1055 converts digital data from the input into an analog signal, modulates onto an RF carrier, amplifies, filters, and transmits the resulting signal through the antenna port. Data received from the antenna port is filtered, amplifi d, wn-converted, digitized, and made available at the output port.

Each of the OFDM Baseband Processing Modules 1045 and 1060 receives digitize symbols from one of RF XCVR 1050 and 1055, extracts timing information, and using a fast Fourier transform (FF1), extracts the symbols modulated onto each individual subcarrier. Each OFDM Baseband Processing Modules 1045 and 1060 makes the resulting data stream available at an output port received by Multi-Antenna Combining Module 1065. Using the differential OFDM multiple antenna combining technique described earlier, Multi-Antenna Combining Module 1065 generates a single combined data stream 1068.

Detector/Receiver 1070 converts the symbols in data stream 1068 into a binary digital stream, and removes the CFR bits and error control encoding bits, resulting in a data stream 1073. Logical Channel De-Multiplexing Module 1075 receives and routes the data bursts in data stream 1073 to the third ports of LCMs 1020, 1025, and 1030.

Peer-to-peer connections are easily supported in WIAS 100. As shown in FIGS. 9 and 10, the functionality of the SU and RP are very similar. To initiate a peer-to-peer connection, one SU, for example SU 105, simply generates an NCC burst on a frequency channel that is selected in accordance with the spectrum management described above. The NCC burst is specially identified as a peer-to-peer (PTP) NCC with the SU's IP address. A second subscriber, for example SU 106, can link to SU 105 by registering with SU 105 exactly as if SU 105 were an RP. This registration allows direct data, voice, or video links between subscribers, even in the absence of the WIAS network.

If necessary, WIAS 100 can be implemented as a fiber distributed data (FDD) system. This implementation is particularly useful for applications in the licensed PCS bands in the United States. Although this implementation sacrifices the ability of the system to dynamically adapt to match traffic asymmetry, it eases deployments along side other FDD systems. In this case, the WIAS downlink is fixed at 16 slots per frame (the NCC followed by 15 downlink user data slots). And the WIAS uplink is fixed at 16 slots per frame (the RAS followed by 15 uplink user data slots).

WIAS 100 can use wireless links to connect subnets. There are many existing products that operate in the high U-NII band that can serve this purpose. Typically, such a wireless backbone would be deployed using directional antennas to provide a point-to-point link between an RP and a router. Alternatively, WIAS 100 can be used in a Multi-Hop mode. This requires multiple RF transceiver cards in the RPs, such as shown in FIG. 9, one to provide subscriber access and one other for each multi-hop terminus.

While the above description has focused on the delivery of wireless Internet access for campus environments, the system can also be used as the wireless framework for applications as diverse as wireless local loop, battlefield communications, and point-to-point data delivery. It will be apparent to those skilled in the art that various modifications and variations can be made without departing from the scope or spirit of the invention. Other embodiments of the invention will be apparent to those skilled in the art from consideration of the specification and practice of the embodiments of the invention disclosed herein. The specification and examples should be considered exemplary, with the true scope and spirit of the invention being indicated by the following claims and their full range of equivalents.

What is claimed is:

1. A method for decoding symbols modulated onto a plurality of subcarriers, each symbol corresponding to one or more data bits where each combination of bits represents a unique phase, comprising the steps of:

receiving, at a plurality of antennas, a waveform formed from the superposition of a plurality of modulated subcarriers, each modulated subcarrier having a different frequency and formed by modulating one of a plurality of serial symbols onto a corresponding one of a plurality of subcarriers based on the difference in phase between each pair of adjacent symbols;

extracting the response of each antenna to each of the individual subcarriers;

forming a vector for each subcarrier having a plurality of elements equal to the number of antennas, each element of a vector of a particular subcarrier representing the extracted response of one of the plurality of antennas to the particular subcarrier;

combining mathematically the vectors corresponding to each pair of adjacent subcarriers to calculate the phase difference between each pair of adjacent subcarriers; and determining the value of each symbol based on the phase differences resulting from the mathematical combination of each pair of adjacent vectors.

2. A system for decoding symbols modulated onto a plurality of subcarriers, each symbol corresponding to one or more data bits where each combination of bits represents a unique phase, said system comprising:

a plurality of antennas;

means for receiving at said antennas a waveform formed from the superposition of a plurality of modulated subcarriers, each modulated subcarrier having a different frequency and formed by modulating one of a plurality of serial symbols onto a corresponding one of a plurality of subcarriers based on the difference in phase between each pair of adjacent symbols;

means for extracting the response of each of said antennas to each of the individual subcarriers;

means for forming a vector for each subcarrier having a plurality of elements equal to the number of antennas, each element of a vector of a particular subcarrier representing the extracted response of one of said plurality of antennas to the particular subcarrier;

means for mathematically combining the vectors corresponding to each pair of adjacent subcarriers to calculate the phase difference between each pair of adjacent subcarriers; and means for determining the value of each symbol based on the phase differences resulting from the mathematical combination of each pair of adjacent vectors.

* * * * *

UNITED STATES PATENT AND TRADEMARK OFFICE
CERTIFICATE OF CORRECTION

PATENT NO. : 7,433,297 B2
APPLICATION NO. : 10/930320
DATED : October 7, 2008
INVENTOR(S) : Barton et al.

It is certified that error appears in the above-identified patent and that said Letters Patent is hereby corrected as shown below:

In the Specification

In Column 3, Line 18, delete "100/10BaseT" and insert -- 100/10BaseT --, therefor.

In Column 3, Line 63, delete "(PSTN) 160." and insert -- (PSTN) 150. --, therefor.

In Column 3, Lines 66-67, delete "EP phone 170" and insert -- IP phone 170 --, therefor.

In Column 8, Line 41, delete "(from.the" and insert -- (from the --, therefor.

In Column 15, Lines 47-51, in Equation (13), delete "
$$E_{\theta,n}\{Y_k\} = MZ_k^* Z_{k-1} \sum_{l=0}^{N_L-1} \alpha_l^2 e^{j2\pi\Delta fr_l} + \psi(M) Z_k^* Z_{k-1} \sum_{l=0}^{N_L-1} \sum_{\substack{p=0 \\ p \neq 0}}^{N_L-1} \alpha_p e^{-j(\gamma_p - 2\pi f_k + \rho_p)} \alpha_p e^{j(\gamma_l - 2\pi(f_{k-1} + \rho_l)r_l)}$$
" and insert --
$$E_{\theta,n}\{Y_k\} = MZ_k^* Z_{k-1} \sum_{l=0}^{N_L-1} \alpha_l^2 e^{j2\pi\Delta fr_l} + \psi(M) Z_k^* Z_{k-1} \sum_{l=0}^{N_L-1} \sum_{\substack{p=0 \\ p \neq 0}}^{N_L-1} \alpha_p e^{-j(\gamma_p - 2\pi f_k + \rho_p)r_p} \alpha_p e^{j(\gamma_l - 2\pi(f_{k-1} + \rho_l)r_l)}$$
--, therefor.

Signed and Sealed this
Ninth Day of December, 2014

Michelle K. Lee
*Deputy Director of the United States Patent and Trademark Office*

In Column 16, Lines 54-57, in Equation (19), delete "$Y_k = V_k^H v_{k-1} e^{-j2\pi\Delta f T_o}$
$$\approx e^{-j(\varphi_k - \varphi_{k-1})} M \sum_{l=0}^{N_L-1} \alpha_l^2 e^{j2\pi\Delta f(\tau_l - T_o)} + \varepsilon_k e^{-j2\pi\Delta f T_o}$$" and insert --$Y_k = V_k^H v_{k-1} e^{-j2\pi\Delta f T_o}$
$$\approx e^{-j(\varphi_k - \varphi_{k-1})} M \sum_{l=0}^{N_L-1} \alpha_l^2 e^{j2\pi\Delta f(\tau_l - T_o)} + \varepsilon_k e^{-j2\pi\Delta f T_o}$$--, therefor.

In Column 17, Line 9, delete "burst-toburst" and insert -- burst-to-burst --, therefor.

In Column 17, Line 36, delete "$\phi_0.\pi/4$" and insert -- $\phi_0 = \pi/4$ --, therefor.

In the Claims

In Column 24, Line 32, in Claim 2, delete "said" and insert -- the --, therefor.